United States Patent
Ng et al.

(10) Patent No.: US 11,858,128 B1
(45) Date of Patent: Jan. 2, 2024

(54) RAPID BRAKING SYSTEM FOR AN AUTONOMOUS MOBILE DEVICE

(71) Applicant: AMAZON TECHNOLOGIES, INC., Seattle, WA (US)

(72) Inventors: Benny Ng, San Leandro, CA (US); Siddharth Gupta, Redwood City, CA (US); Marcel Colman Eric Stieber, Sunnyvale, CA (US); Rex L Allison, Santa Clara, CA (US); Christopher Wells Fitzhugh, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 259 days.

(21) Appl. No.: 16/022,527

(22) Filed: Jun. 28, 2018

(51) Int. Cl.
*B25J 9/00* (2006.01)
*B25J 9/16* (2006.01)
(Continued)

(52) U.S. Cl.
CPC ........... *B25J 9/0009* (2013.01); *B25J 9/1666* (2013.01); *B25J 9/1694* (2013.01); *B25J 11/008* (2013.01); *H02M 1/08* (2013.01)

(58) Field of Classification Search
CPC ...... B25J 9/0009; B25J 9/1666; B25J 9/1694; B25J 11/008
(Continued)

(56) References Cited

U.S. PATENT DOCUMENTS 4,786,847 A * 11/1988 Daggett ............. G05B 19/4141
901/3

5,801,502 A * 9/1998 Monzen ................ E05F 15/632
49/32
(Continued)

FOREIGN PATENT DOCUMENTS

| CN | 107769362 | * 12/2017 | ................ H02J 7/36 |
| DE | 11 2014 006 373 | * 3/2016 | ................ H02P 3/22 |

OTHER PUBLICATIONS

Infineon Technologies AG, "BSC028N06NS, OptiMOS Power-Transistor", Infineon Technologies AG., Jan. 18, 2013, Rev. 2.1, 9 pages. Retrieved from the Internet: <URL:https://www.infineon.com/dgdl/BSC028N06NS_Rev2.0.pdf?folderId=db3a30431ddc9372011ebafa04517f8b&fileId=db3a3043345a30bc013465d221bd62f9>.
(Continued)

*Primary Examiner* — Kawing Chan
*Assistant Examiner* — Zemenay T Truneh
(74) *Attorney, Agent, or Firm* — Lindauer Law, PLLC

(57) ABSTRACT

A device that uses a motor may quickly and safely stop the motor using a rapid braking system. For example, the device may stop to avoid collision with an object, upon determining a failure of an internal component, upon receipt of a command, and so forth. Responsive to a signal to stop, the motor is disconnected from the battery. A braking circuit is activated that dissipates, in a controlled fashion, power produced by continuing motion of the motor. When the voltage produced by the motor's continuing motion drops below a threshold, a stop circuit shorts the terminals of the motor, causing the motor to resist further rotation. When the stop condition no longer applies the signal to stop is removed resulting in the motor being reconnected to the battery, the braking circuit being deactivated, the stop circuit opens the short between the terminals of the motor, and normal operation resumes.

13 Claims, 14 Drawing Sheets

(51) Int. Cl.
*B25J 11/00* (2006.01)
*H02M 1/08* (2006.01)

(58) Field of Classification Search
USPC .................................................. 318/567
See application file for complete search history.

(56) References Cited

U.S. PATENT DOCUMENTS

| | | | | |
|---|---|---|---|---|
| 2014/0152201 | A1* | 6/2014 | Shriver | H02P 3/08 |
| | | | | 318/362 |
| 2016/0136823 | A1* | 5/2016 | Choi | G01M 3/005 |
| | | | | 74/490.03 |
| 2016/0211660 | A1* | 7/2016 | Laven | H01L 23/528 |
| 2017/0373613 | A1* | 12/2017 | Duerr | H02H 7/20 |
| 2018/0110489 | A1* | 4/2018 | Nam | A61B 6/586 |
| 2019/0092382 | A1* | 3/2019 | Kogure | B62D 5/0409 |
| 2019/0229650 | A1* | 7/2019 | Demont | B60L 50/40 |

OTHER PUBLICATIONS

Infineon Technologies AG, "BSC052N03LS, OptiMOS Power-MOSFET", Infineon Technologies AG., May 14, 2013, Rev. 2.2, 10 pages. Retrieved from the Internet: <URL:https://www.infineon.com/dgdl/BSC052N03LS_Rev+2.1.pdf?folderId=db3a304313b8b5a60113cee8763b02d7&fileId=db3a30432c64a60d012cbc1084350363>.

Littlefuse, Inc., "nanoSMDC075F, PolySwitch PTC Devices, Overcurrent Protection Device", Littelfuse, SCD25128 Rev. N, Jul. 26, 2016, 2 pages. Retrieved from the Internet: <URL:https://datasheet.octopart.com/NANOSMDC075F-2-Raychem-datasheet-87153670.pdf>.

Nexperia B.V., "74AUP1G11 Low-power 3-input and gate", Nexperia B.V., 74AUP1G11 Rev. 4, Aug. 3, 2012, 19 pages. Retrieved from the Internet: <URL:https://assets.nexperia.com/documents/data-sheet/74AUP1G11.pdf>.

Nexperia B.V., "PMEG3050EP 5 A low VF MEGA Schottky barrier rectifier", Nexperia B.V., PMEG3050EP, Dec. 12, 2017, 14 pages. Retrieved from the Internet: <URL:https://assets.nexperia.com/documents/data-sheet/PMEG3050EP.pdf>.

ON Semiconductor, "MM3Z2V4B-MM3Z75VB Zener Diodes", Fairchild Semiconductor Corporation, MM3Z2V4B-MM3Z75VB Rev. A4, Oct. 2010, 8 pages. Retrieved from the Internet: <URL:https://www.fairchildsemi.com/datasheets/MM/MM3Z10VB.pdf>.

Panasonic Electronic Works Co., Ltd., "TX Series Relays", Panasonic Electronic Works Co., Ltd., TX2SA-3V-Z Rev. 2010, 7 pages. Retrieved from the Internet: <URL:https://media.digikey.com/pdf/Data%20Sheets/Panasonic%20Electric%20Works%20PDFs/TX_Series_Rev2010.pdf>.

Texas Instruments, Inc., "DRV832x 6 to 60-V Three-Phase Smart Gate Driver", Texas Instruments, SLVSDJ3B, Feb. 2017, Rev. Dec. 2017, 90 pages. Retrieved from the Internet: <URL:http://www.ti.com/lit/ds/symlink/drv8320.pdf>.

Texas Instruments, Inc., "LM317 3-Terminal Adjustable Regulator", Texas Instruments, SLVS044X, Sep. 1997, Rev. Sep. 2016, 31 pages. Retrieved from the Internet: <URL:http://www.ti.com/lit/ds/symlink/lm317.pdf>.

Texas Instruments, Inc., "LM5069 Positive High-Voltage Hot Swap and In-Rush Current Controller With Power Limiting", Texas Instruments, SNVS452E, Sep. 2006, Rev. Nov. 2016, 37 pages. Retrieved from the Internet: <URL:http://www.ti.com/lit/ds/symlink/lm5069.pdf>.

Texas Instruments, Inc., "TLV170x 2.2-V to 36-V, microPower Comparator", Texas Instruments, SBOS589D, Dec. 2013, Rev. Jun. 2015, 34 pages. Retrieved from the Internet: <URL:http://www.ti.com/lit/ds/symlink/tlv1701.pdf>.

Texas Instruments, Inc.,, "UCC2753x 2.5-A and 5-A, 35-VMAX VDD FET and IGBT Single-Gate Driver", Texas Instruments, SLUSBA7F, Dec. 2012, Rev. Jul. 2015, 47 pages. Retrieved from the Internet: <URL:http://www.ti.com/lit/ds/symlink/ucc27536.pdf>.

Trinamic Motion Control GmbH & Co. K.G., "QMot QBL4208 family", Trinamic Motion Control GmbH & Co. K.G., QBL4208 Manual V1.03, Nov. 3, 2010, 14 pages. Retrieved from the Internet: <URL:https://www.trinamic.com/fileadmin/assets/Products/Motors_Documents/QBL4208_manual.pdf>.

Vishay, "28 V, 56 mΩ, Load Switch with Programmable Current Limit and Slew Rate Control", Vishay Siliconix, S16-2135-Rev. E, Oct. 24, 2016, 14 pages. Retrieved from the Internet: <URL:http://www.vishay.com/docs/63939/sip32429.pdf>.

Vishay, "50 mΩ, Slew Rate Controlled Load Switch in WCSP", Vishay Siliconix, S14-0842-Rev. D, Apr. 28, 2014, 14 pages. Retrieved from the Internet: <URL:http://www.vishay.com/docs/67754/sip32461.pdf>.

Vishay, "N-Channel 30 V (D-S) MOSFET", Vishay Siliconix, S14-1224-Rev. C, Jun. 16, 2014, 12 pages. Retrieved from the Internet: <URL:http://www.vishay.com/docs/67073/si1414dh.pdf>.

* cited by examiner

RAPID BRAKING SYSTEM FOR AN AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
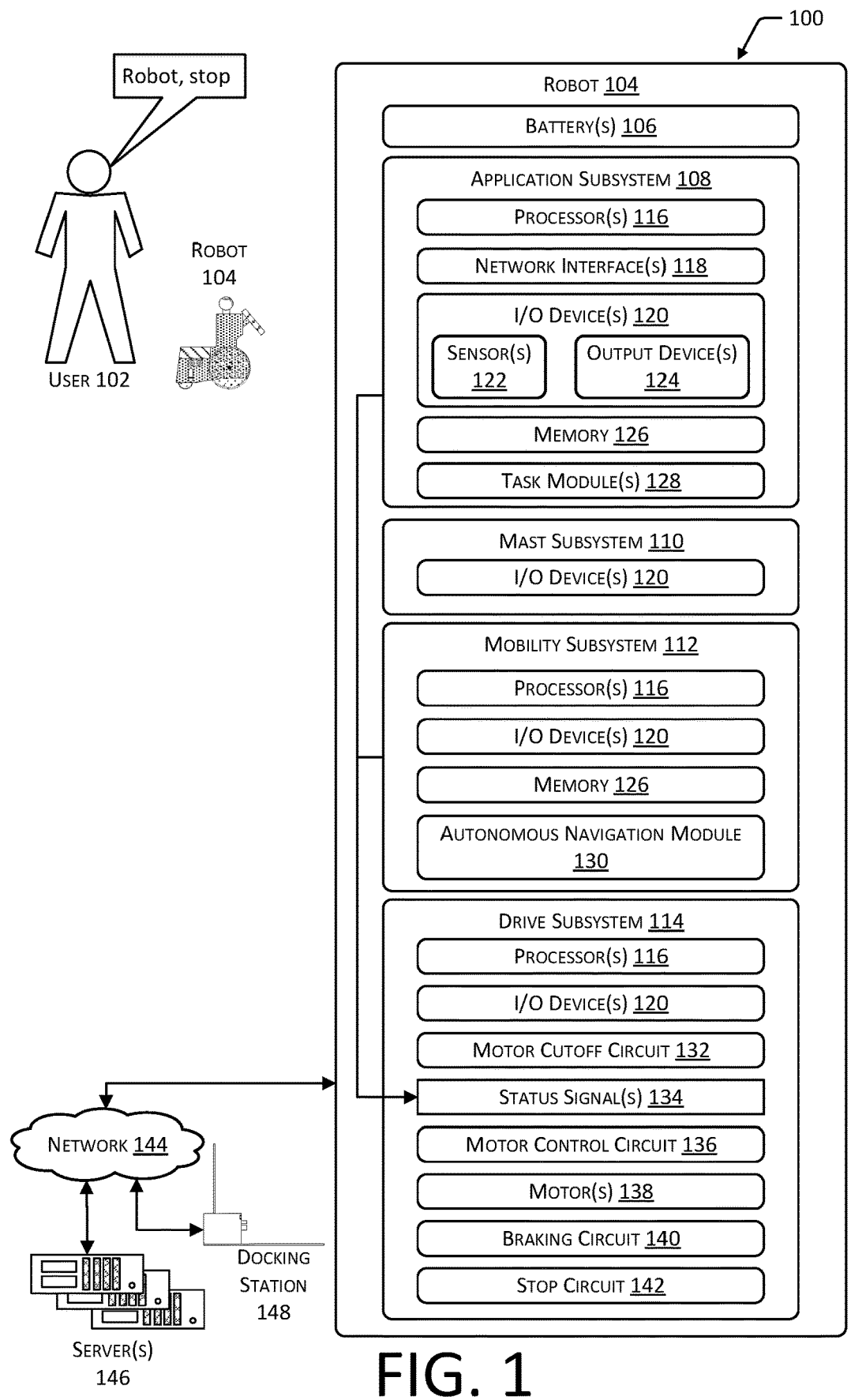
FIG. 1 illustrates a system that includes an autonomous mobile device, such as a robot, with a rapid braking system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device such as a robotic assistant (robot) may perform various tasks. These tasks may include one or more of executing a particular application or moving the robot. Applications may include particular computer programs comprising instructions, that when executed, perform various functions. For example, a first task may involve the user requesting the robot to play a particular song using a music application. In another example, a second task may involve the user requesting the robot to move to a different room. In another example, a third task may involve the user requesting the robot to initiate a video call and follow the user as they move throughout the home. The robot is capable of autonomous movement, allowing it to move from one location in the home to another without being "driven" or remotely controlled by the user or other human.

The robot operates on electrical power provided by a power source, such as one or more rechargeable batteries. The electrical power may then be used to operate one or more motors that are used to move the robot from one location to another. Other motors may be used to move other parts, such as extending a mast, operating a manipulator arm, and so forth. In one implementation, a motor may comprise a three-phase brushless direct current (BLDC) motor that is coupled to a drive wheel. The robot may include two motors, one driving a left drive wheel and one driving a right drive wheel. By controlling the power provided to the respective wheels, the robot may be able to rotate, move forward, move backward, and so forth.

During normal operation the robot may operate the motors to move from one location to another. This operation may include slowing and stopping in the normal course of movement. For example, pulse width modulation (PWM) techniques may be used to control the power to the motors during normal operation. During normal operation, when the robot slows down a PWM controller may decrease the power delivered to the motors and allow the robot to come to rest. However, it may be necessary to perform a rapid stop of the robot in some situations. The rapid stop should decelerate the robot quickly but without being so fast that the robot could topple or skid. The rapid stop should also prevent or reduce the potential for damage to internal components of the robot.

A rapid stop may be initiated responsive to various stop conditions. For example, the stop conditions may include expected collision of the robot with an object, actual collision of the robot with an object, receipt of a command to rapidly stop movement of the robot, failure of one or more components of the robot, and so forth. In other implementations, other stop conditions may be determined, such as if rotation of a wheel is less than a threshold value.

Described in this disclosure is a braking system that allows a device, such as a robot, to perform a rapid stop that is safe. The system "fails safe" in that it will immediately perform the rapid stop in the event a stop condition is signaled, and is able to operate even in the event of partial or complete loss of power. While the following descriptions may describe a single motor, it is understood that the system may operate with any number of motors. These motors may be single phase or multiple-phase.

During normal operation of the robot, various subsystems or portions of subsystems provide an input to a multiple-input AND gate. So long as these inputs are in a "high" (above a threshold voltage) state the AND gate produces a high output. In the event of one or more stop conditions, at least one of these inputs transitions to a "low" (below the threshold voltage) state, resulting in the output from the multiple-input AND gate transitioning to a "low" state. The "low" state acts as a signal that operates various circuits in the braking system. Responsive to the signal, a motor cutoff circuit disconnects the motor from the power source, preventing current from flowing between the motor and the power source. This disconnect prevents further power from being provided to the motor.

Even with the power source disconnected from the motor, the robot may continue moving due to inertia. Also responsive to the signal, a braking circuit begins to safely and in a controlled fashion dissipate the power produced by the motor. For example, with external power removed, the motor may act as a generator, converting motion into electrical power. The braking circuit may take the power produced by the motor and deliver it, at a predetermined rate, to one or more resistors. For example, the braking circuit may utilize a current regulator with the input being connected to the motor, the output being connected to a resistor, and the current regulator controlled by the signal. In some implementations, the power may be used to charge a battery, producing regenerative braking. By maintaining the dissipation of power at the predetermined rate the deceleration of the robot is controlled and predictable, preventing skidding or toppling. The controlled dissipation of power also prevents potential damage to components in the robot due to excessive current, voltage, and so forth.

In some implementations, the braking circuit may utilize a braking clamp circuit. The braking clamp circuit may be configured to determine if a voltage produced by the motor exceeds a threshold value, and if so, directly connects the motor to a resistive load. The braking clamp circuit may operate in conjunction with the current regulators described above. When the voltage produced by the motor drops below the threshold value, the braking clamp circuit may disconnect the resistive load, with the remaining energy dissipated through the current regulators as described above.

As the motor slows, and the resulting back electromotive force (EMF) produced by the motor drops below a threshold value, a stop circuit operates. In one implementation, the stop circuit may incorporate a relay that, during normal operation, energizes a coil that in turn prevents a connection between the terminals (or windings) of the motor. As the voltage drops below a threshold value, the coil is deenergized and the relay establishes a connection between the terminals of the motor, producing a short between these terminals. This short may retard further rotation of the shaft of the motor. For example, with a BLDC motor, a short between the terminals results in the motor's shaft being resistant to rotation.

The connection between the terminals of the motor may include a fuse. In the event the motor is rotated by an external force, such as if the robot is pushed, the power produced by the rotation of the motor will open the fuse to prevent damage.

When the stop condition is removed and a start or normal condition is obtained, the inputs to the multiple-input AND gate are again all "high". As a result, the relay in the stop circuit is again energized, disconnecting the short between the motor's terminals. The braking circuit discontinues dissipation of power, and the motor cutoff circuit reconnects the motor to the power supply. The robot may now resume normal operation.

By using the system described herein, the robot or other autonomous mobile device is able to more safely perform a rapid stop. Once a stop condition is determined, the latency of the system is extremely low due to the design of the circuitry. The ability of the system to operate even if there is a partial or complete failure of the power source further improves safety.

Illustrative System

FIG. 1 illustrates a system 100 in which a user 102 uses a robot 104 with a rapid braking system, according to some implementations. The robot 104 may include a battery(s) 106 to provide electrical power for operation of the robot 104. The battery 106 may be rechargeable, allowing it to store electrical energy obtained from an external source. The techniques described in this disclosure may be applied to other types of power sources, including but not limited to: fuel cells, flywheels, capacitors, superconductors, wireless power receivers, and so forth. For example, instead of a battery 106 the robot 104 may use one or more supercapacitors to store electrical power for use.

The robot 104 may include several subsystems, such as an application subsystem 108, a mast subsystem 110, a mobility subsystem 112, a drive subsystem 114, and so forth. In other implementations, other arrangements of subsystems may be present. These subsystems may be powered by the battery(s) 106.

The application subsystem 108 includes one or more hardware processors (processors) 116. The processors 116 may comprise one or more cores. The processors 116 may include microcontrollers, systems on a chip, field programmable gate arrays, digital signal processors, graphic processing units, general processing units, and so forth. One or more clocks may provide information indicative of date, time, ticks, and so forth.

The robot 104 may include one or more communication interfaces such as input/output (I/O) interfaces, network interfaces 118, and so forth. The communication interfaces enable the robot 104, or components thereof, to communicate with other devices or components. The I/O interfaces may comprise Inter-Integrated Circuit (I2C), Serial Peripheral Interface (SPI) bus, Universal Serial Bus (USB) as promulgated by the USB Implementers Forum, RS-212, and so forth.

The network interfaces 118 may be configured to provide communications between the robot 104 and other devices such as other robots 104, a docking station, routers, access points, and so forth. The network interfaces 118 may include devices configured to couple to personal area networks (PANs), local area networks (LANs), wireless local area networks (WLANS), wide area networks (WANs), and so forth. For example, the network interfaces 118 may include devices compatible with Ethernet, Wi-Fi, Bluetooth, Bluetooth Low Energy, ZigBee, and so forth.

The I/O interface(s) may couple to one or more I/O devices 120. The I/O devices 120 may include input devices such as one or more sensors 122. The I/O devices 120 may also include output devices 124 such as one or more of a motor, light, speaker, display, projector, printer, and so forth. In some embodiments, the I/O devices 120 may be physically incorporated with the robot 104 or may be externally placed. Network interfaces 118, sensors 122, and output devices 124 are discussed in more detail below with regard to FIG. 3.

The robot 104 may also include one or more busses or other internal communications hardware or software that allow for the transfer of data between the various modules and components of the robot 104.

The application subsystem 108 of the robot 104 includes one or more memories 126. The memory 126 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 126 provides storage of computer-readable instructions, data structures, program modules, and other data for the operation of the robot 104. A few modules are shown stored in the memory 126, although the same functionality may alternatively be implemented in hardware, firmware, or as a system on a chip (SoC).

The memory 126 may store instructions, such as one or more task modules 128, that may be executed at least in part by the one or more processors 116. For example, the task modules 128 may comprise applications that perform various function such as placing a video call, following the user 102 as they move, playing audio content, presenting video content, and so forth. Additional modules that may be stored within the memory 126 are discussed below with regard to FIG. 2. For example, the memory 126 may store, and the processor 116 may execute, a speech processing module that allows the user 102 to provide verbal comments to the robot 104.

In some implementations the robot 104 may include a mast subsystem 110. The mast subsystem 110 may include an extensible mast that supports one or more I/O devices 120. For example, the mast may provide physical support for one or more cameras, microphones, speakers, lights, image projectors, and so forth. In some implementations the movement of the mast or other devices associated with the mast may be included as outputs. For example, extension and retraction of the mast may be used to provide a particular output indicator to the user 102.

The mobility subsystem 112 includes one or more processors 116. These may be of the same type as the processors 116 used in other subsystems or different. The processors 116 may comprise one or more cores. The processors 116 may include microcontrollers, systems on a chip, field programmable gate arrays, digital signal processors, graphic processing units, general processing units, and so forth. One or more clocks may provide information indicative of date, time, ticks, and so forth. The mobility subsystem 112 may also comprise one or more memories 126 comprising CRSM. In some implementations, the memory 126 may be the same as or may differ from the memory 126 of the application subsystem 108.

The mobility subsystem 112 may include one or more I/O devices 120. For example, the mobility subsystem 112 may include sensors 122 used to detect or avoid collision with an object.

The mobility subsystem 112 may include an autonomous navigation module 130. The autonomous navigation module 130 may be implemented as one or more of dedicated hardware, instructions stored in the memory 126 and executed on one or more processors 116, as instructions executed on an external device such as a server that is accessed via the network interfaces 118, and so forth. The autonomous navigation module 130 may be configured to move the robot 104. In some situations, the movement may be responsive to instructions directing movement of the robot 104 that are associated with a particular task. For example, the user 102 may issue a request to the robot 104 for the robot 104 to follow the user 102. The request may be processed by the application subsystem 108 that sends instructions to the mobility subsystem 112 that directs the robot 104 to follow the user 102.

The autonomous navigation module 130 of the mobility subsystem 112 may use sensor data from the one or more sensors 122 to find the user 102 in the environment, determine a path to move the robot 104, determine obstacles to be avoided, and so forth. The mobility subsystem 112 determines where and how the robot 104 is to be moved and provides instructions to the drive subsystem 114.

The drive subsystem 114 receives the instructions from the mobility subsystem 112 and proceeds to operate one or more motors. The drive subsystem 114 may include one or more processors 116, I/O devices 120, memory 126 (not shown), and a rapid braking system that includes a motor cutoff circuit 132. The motor cutoff circuit 132 receives status signal(s) 134 from one or more subsystems such as the application subsystem 108, the mast subsystem 110, the mobility subsystem 112, the drive subsystem 114 itself, or other subsystems. The status signal 134 may be indicative of a stop condition. For example, if the status signal 134 transitions from a "high" value (above a threshold voltage) to a "low" value (below the threshold voltage), the status signal 134 may be indicative of a stop condition. Continuing the example, the mast subsystem 110 may provide a status signal 134 that is a high value during normal operation, but transition to a low value in the event of a fault, such as a failure to retract the mast.

The stop condition may result from the autonomous navigation module 130 determining an expected collision of the robot 104 with an object, sensors 122 determining an actual collision of the robot 104 with an object, the application subsystem 108 indicating receipt of a command to rapidly stop movement of the robot 104, failure of one or more components of the robot 104, and so forth. In one implementation, if any of the status signals 134 are indicative of a stop condition, the rapid braking system operates. Other stop conditions may also be determined, such as rotation of a wheel being less than a threshold value.

During normal operation, when no stop condition is present, a motor control circuit 136 provides power to drive one or more motors 138. For example, the motor control circuit 136 may be configured to deliver a particular voltage, provide a particular pulse pattern of power, deliver power to particular windings of the motor 138 at particular times, and so forth. During normal operation, the robot 104 may be stopped by commanding the motor control circuit 136 to cease providing power to the motor 138.

Responsive to a signal indicative of a stop condition, the motor cutoff circuit 132 disconnects the motors 138 from the battery 106. For example, the motor cutoff circuit 132 may interrupt a path of current flow between the battery 106, the motor control circuit 136, and the motor 138. As a result, no further power is delivered to the motor 138. In some implementations the power to the motor control circuit 136 may be interrupted as well. The motor cutoff circuit 132 is discussed in more detail with regard to FIG. 5.

While the motor 138 is disconnected from the battery 106, the inertia of the robot 104 may keep the robot 104 moving. This inertia may result in the drive wheels turning the motor 138, which now may act like a generator that produces electric power. Responsive to the signal indicative of the stop condition, the braking circuit 140 operates to dissipate the power produced by the motor 138. The braking circuit 140 may operate to dissipate this power at a predetermined rate. For example, a current regulator may be used to limit the current provided to a resistor that dissipates the produced power as heat. By limiting the dissipation of power to a predetermined rate, the robot 104 slows down at a predetermined rate. This brings the robot 104 to a rapid but controlled stop that avoids tipping or skidding. This also allows the robot 104 to rapidly slow down without significant wear and tear on the components. The braking circuit 140 is discussed in more detail with regard to FIG. 6A.

In some implementations, if the back electromotive force (EMF) produced by the motor 138 as a result of continuing rotation exceeds a threshold value, a braking clamp circuit may be used to dissipate additional energy. The braking clamp circuit is described in more detail with regard to FIG. 6B. Once the back EMF is below a threshold value, the braking clamp circuit may deactivate, and the braking circuit 140 may continue to operate.

Once the back EMF produced by the motor 138 is below a threshold value, a stop circuit 142 operates. At this point, the robot 104 has now slowed or is completely stopped. The stop circuit 142 operates to resist motion of the robot 104. The stop circuit 142 may operate to connect the terminals (or windings) of the motor 138 under certain conditions. For example, the stop circuit 142 may comprise a relay that is energized during normal operation. When the back EMF drops below the threshold value, the coil is de-energized, completing the electrical circuit between the terminals of the motor 138. By creating a short between the terminals of the motor 138, further rotation of the shaft may be inhibited. A fuse may be placed in series with the relay to prevent potential damage to the robot 104. For example, if the user 102 pushes the robot 104 while the stop circuit 142 has the terminals shorted, the motor 138 could generate sufficient power to damage components in the motor 138. In this situation, the fuse would open, removing the short and preventing damage. The stop circuit 142 is discussed in more detail with regard to FIG. 7.

The various subsystems may be physically located on separate circuit boards. For example, each subsystem may comprise components that share a common rigid or flexible printed circuit board. In some implementations, the motor cutoff circuit 132, the motor control circuit 136, the braking circuit 140, and the stop circuit 142 may be arranged on the same circuit board. Such placement improves reliability of the system by removing one or more connectors that could potentially fail.

Each subsystem may have one or more dedicated I/O devices 120. For example, the application subsystem 108 may include cameras, microphones, and so forth while the mobility subsystem 112 may include a LIDAR system, ultrasonic sensors, contact sensors, and so forth.

Communication between the subsystems may utilize various technologies including, but not limited to, Ethernet, universal serial bus (USB), and so forth. For example, the application subsystem 108 may communicate with the mobility subsystem 112 using a USB connection.

In some implementations, other communication paths, protocols, and so forth, may be used. For example, the application subsystem 108 may provide an interrupt pulse along a conductor that is connected to the mobility subsystem 112. This interrupt pulse may be used to indicate when one of the subsystems is performing an operation that may affect the operation of the other at a specific time. Continuing the example, the application system 108 may use a sensor 122 that uses an illuminator that interferes with a sensor 122 used by the mobility subsystem 112. By providing the interrupt pulse, the application subsystem 108 may notify the mobility subsystem 112 as to the illumination, allowing the mobility subsystem 112 to disregard the potentially erroneous data from that sensor 122 during the time associated with the interrupt pulse. This technique allows the two subsystems to operate in conjunction with one another, without the need to maintain synchronized timing between the subsystems. By removing the need for synchronized timing, operation of the robot 104 is simplified. In other implementations, other interrupt lines may be used to provide data indicative of a particular event or occurrence from one subsystem to another.

The lines used to provide the status signals 134 may be provided using dedicated lines. For example, each application subsystem 108 may have a dedicated electrical conductor to the drive subsystem 114 that provides the status signal(s) 134 from that subsystem.

The robot 104 may use the network interfaces 118 to connect to a network 144. For example, the network 144 may comprise a wireless local area network, that in turn is connected to a wide area network such as the Internet. The robot 104 may access one or more servers 146 via the network 144. For example, the robot 104 may utilize a wake word detection module to determine if the user 102 is addressing a request to the robot 104. The wake word detection module may hear a specified word or phrase and transition the robot 104 or portion thereof to a particular operating mode. Once "awake", the robot 104 may then transfer at least a portion of the audio spoken by the user 102 to the servers 146 for further processing. The servers 146 may process the spoken audio and return to the robot 104 data that may be subsequently used to operate the robot 104.

In some implementations, the speech processing for particular words or phrases may be handled locally. For example, as shown here the user 102 has said "robot, stop". The speech processing module of the robot 104 may recognize the command to "stop" and generate a signal indicative of a stop condition. As a result, the rapid braking system described herein may be activated.

The robot 104 may be configured to dock or connect to a docking station 148. The docking station 148 may also be connected to the network 144. For example, the docking station 148 may be configured to connect to the wireless local area network such that the docking station 148 and the robot 104 may communicate. Operation functionality of the docking station 148 is described in more detail below with regard to FIG. 13.

In other implementations, other types of an autonomous mobile device (AMD) may use the systems and techniques described herein. For example, the AMD may comprise an autonomous ground vehicle that is moving on a street, an autonomous aerial vehicle in the air, and so forth.

Figure 2:
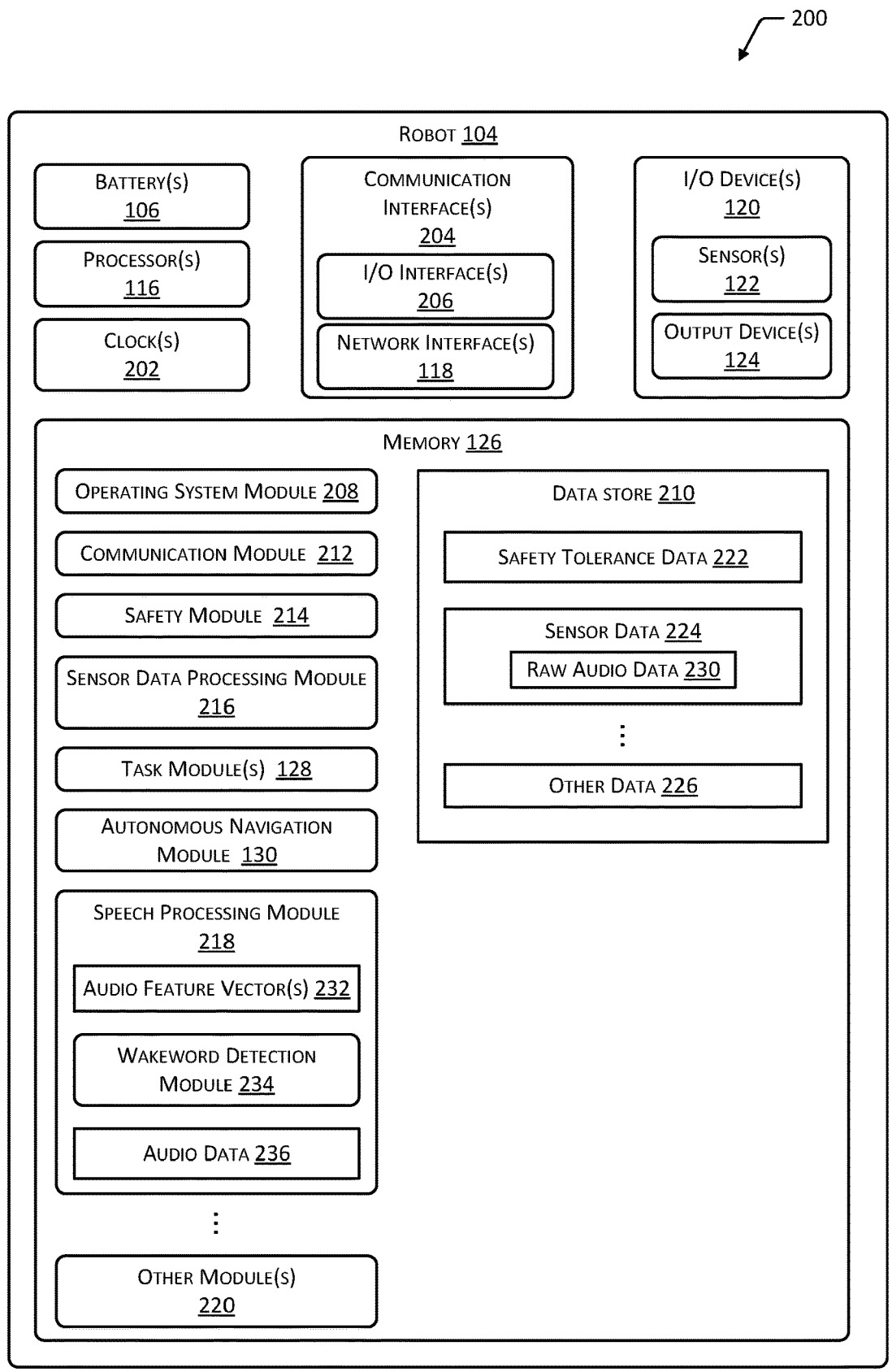
FIG. 2 is a block diagram of the components of the robot, according to some implementations.

FIG. 2 is a block diagram 200 of the robot 104, according to some implementations. For ease of illustration, and not necessarily as a limitation, the overall system is shown without demarcation into the various subsystems.

The robot 104 may include one or more batteries 106 or other power source to provide electrical power suitable for operating the components in the robot 104. The power source may include batteries, capacitors, fuel cells, storage flywheels, wireless power receivers, and so forth.

The robot 104 may include one or more hardware processor 116 (processors) configured to execute one or more stored instructions. The processor 116 may comprise one or more cores. The processor 116 may include microcontrollers, systems on a chip, field programmable gate arrays, digital signals processors, graphic processing units, general processing units, and so forth. One or more clocks 202 may provide information indicative of date, time, ticks, and so forth. For example, the processor 116 may use data from the clock 202 to associate a particular interaction with a particular point in time.

The robot 104 may include one or more communication interfaces 204 such as input/output (I/O) interfaces 206, network interfaces 118, and so forth. The communication interfaces 204 enable the robot 104, or components thereof, to communicate with other devices or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 120. The I/O devices 120 may include input devices such as one or more of a sensor 122, keyboard, mouse, scanner, and so forth. The I/O devices 120 may also include output devices 124 such as one or more of a motor, light, speaker, display, projector, printer, and so forth. In some embodiments, the I/O devices 120 may be physically incorporated with the robot 104 or may be externally placed.

The network interfaces 118 may be configured to provide communications between the robot 104 and other devices such as other robots 104, the docking station 148, routers, access points, and so forth. The network interfaces 118 may include devices configured to couple to personal area networks (PANs), local area networks (LANs), wireless local area networks (WLANS), wide area networks (WANs), and so forth. For example, the network interfaces 118 may include devices compatible with Ethernet, Wi-Fi, Bluetooth, Bluetooth Low Energy, ZigBee, and so forth.

The robot 104 may also include one or more busses or other internal communications hardware or software that allow for the transfer of data between the various modules and components of the robot 104.

As shown in FIG. 2, the robot 104 includes one or more memories 126. The memory 126 may comprise one or more non-transitory computer-readable storage media (CRSM). The CRSM may be one or more of an electronic storage medium, a magnetic storage medium, an optical storage medium, a quantum storage medium, a mechanical computer storage medium, and so forth. The memory 126 provides storage of computer-readable instructions, data structures, program modules, and other data for the operation of the robot 104. A few example functional modules are shown stored in the memory 126, although the same functionality may alternatively be implemented in hardware, firmware, or as a system on a chip (SoC).

The memory 126 may include at least one operating system (OS) module 208. The OS module 208 is configured to manage hardware resource devices such as the I/O interfaces 206, the I/O devices 120, the communication interfaces 204, and provide various services to applications or modules executing on the processor 116. The OS module 208 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 126 may be a data store 210 and one or more of the following modules. These modules may be executed as foreground applications, background tasks, daemons, and so forth. The data store 210 may use a flat file, database, linked list, tree, executable code, script, or other data structure to store information. In some implementations, the data store 210 or a portion of the data store 210 may be distributed across one or more other devices including other robots 104, servers 146, network attached storage devices, and so forth.

A communication module 212 may be configured to establish communication with other devices, such as other robots 104, an external server 146, a docking station 148, and so forth. The communications may be authenticated, encrypted, and so forth.

Other modules within the memory 126 may include a safety module 214, a sensor data processing module 216, the autonomous navigation module 130, the one or more task modules 128, a speech processing module 218, or other modules 220. The modules may access data stored within the data store 210, such as safety tolerance data 222, sensor data 224, or other data 226.

The safety module 214 may access safety tolerance data 222 to determine within what tolerances the robot 104 may operate safely within the physical environment. For example, the safety module 214 may be configured to stop the robot 104 from moving when a carrying handle is extended. In another example, the safety tolerance data 222 may specify a minimum sound threshold which, when exceeded, stops all movement of the robot 104. Continuing this example, detection of sound such as a human yell would stop the robot 104. In another example, the safety module 214 may access safety tolerance data 222 that specifies a minimum distance from an object that the robot 104 must maintain. Continuing this example, when a sensor 122 detects an object has approached to less than the minimum distance, all movement of the robot 104 may be stopped. Movement of the robot 104 may be stopped by one or more of inhibiting operations of one or more of the motors 138, issuing a command to stop motor 138 operation, disconnecting power from one or more the motors 138, and so forth. The safety module 214 may be implemented as hardware, software, or a combination thereof. The safety module 214 may produce as output a status signal 134 that is used to control the rapid braking system.

The sensor data processing module 216 may access sensor data 224 that is acquired from one or more the sensors 122. The sensor data processing module 216 may provide various processing functions such as de-noising, filtering, change detection, and so forth. Processing of sensor data 224, such as images from a camera 344, may be performed by a module implementing, at least in part, one or more of the following tools or techniques. In one implementation, processing of the image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 224. In still another implementation, functions such as those in the Machine Vision Toolbox (MVTB) available using MATLAB as developed by Math Works, Inc. of Natick, Massachusetts, USA, may be utilized.

Techniques such as artificial neural networks (ANNs), active appearance models (AAMs), active shape models (ASMs), principal component analysis (PCA), cascade classifiers, and so forth, may also be used to process the sensor data 224 or other data 226. For example, the ANN may be a trained using a supervised learning algorithm such that object identifiers are associated with images of particular objects within training images provided to the ANN. Once trained, the ANN may be provided with the sensor data 224 and produce output indicative of the object identifier.

The autonomous navigation module 130 provides the robot 104 with the ability to navigate within the physical environment without real-time human interaction. For example, the autonomous navigation module 130 may implement one or more simultaneous localization and mapping ("SLAM") techniques to determine an occupancy map or other representation of the physical environment. The SLAM algorithms may utilize one or more of maps, algorithms, beacons, or other techniques to provide navigational data. The navigational data may then be used to determine a path which is then subsequently used to determine a set of commands that drive the motors 138 connected to the wheels. For example, the autonomous navigation module 130 may access environment map data during operation to determine a relative location, estimate a path to a destination, and so forth.

The autonomous navigation module 130 may include an obstacle avoidance module. For example, if an obstacle is detected along a planned route, the obstacle avoidance module may re-route the robot 104 to move around the obstacle or take an alternate route. The autonomous navigation module 130 may produce as output a status signal 134 that is used to control the rapid braking system. For example, if the autonomous navigation module 130 detects an imminent or actual collision with an object, the status signal 134 may be provided that operates the circuitry of the rapid braking system.

The autonomous navigation module 130 may utilize various techniques during processing of sensor data 224. For example, image data obtained from cameras may be processed to determine one or more of corners, edges, planes, and so forth. In some implementations corners may be detected and the coordinates of those corners may be used to produce point cloud data.

The occupancy map may be manually or automatically determined. Continuing the example, during a learning phase, or subsequent operation, the robot 104 may generate an occupancy map that is indicative of locations of obstacles such as chairs, doors, stairwells, and so forth.

In some implementations, the occupancy map may include floor characterization data. The floor characterization data is indicative of one or more attributes of the floor at a particular location within the physical environment. During operation of the robot 104, floor characterization data may be obtained. The floor characterization data may be utilized by one or more of the safety module 214, the autonomous navigation module 130, the task module 128, or other modules 220. For example, the floor characterization data may be used to determine if an unsafe condition occurs such as a wet floor. In another example, the floor characterization data may be used by the autonomous navigation module 130 to assist in the determination of the current location of the robot 104 within the home.

The memory 126 may store one or more task module 128. A task module 128 comprises instructions that, when executed, provide one or more functions associated with a particular task. In one example, the task may comprise a security or watchmen task in which the robot 104 travels throughout the physical environment looking for events that exceed predetermined thresholds. Continuing the example, if the robot 104 detects that the ambient temperature is below a minimum level, or that water is present on the floor, or detects the sound of broken glass, an alert may be generated. The alert may be given as an audible, visual, or electronic notification. For example, the electronic notification may involve the robot 104 transmitting data using one or more of the communication interfaces 204.

In another example, the task may comprise a "follow me" feature in which the robot 104 follows a user 102. For example, the user 102 may participate in a video call using the robot 104. The camera on the mast may be used to acquire video for transmission while the display is used to present video that is received. The robot 104 may use data from one or more sensors 122 to determine a location of the user 102 relative to the robot 104, and track and follow the user 102. In one implementation, computer vision techniques may be used to locate the user 102 within image data acquired by the cameras. In another implementation, the user's voice may be detected by an array of microphones, and a direction to the voice with respect to the robot 104 may be established. Other techniques may be utilized either alone or in combination to allow the robot 104 to track a user 102, follow a user 102, or track and follow a user 102. The path of the robot 104 as it follows the user 102 may be based at least in part on one or more of constraint cost values. For example, while the robot 104 is following the user 102 down the hallway, the robot 104 may stay to the right side of the hallway. In some situations, while following a user 102 the robot 104 may disregard some rules or may disregard the speed values for a particular area. For example, while following the user 102 the robot 104 may not slow down while passing a doorway.

In yet another example, the task may allow for the robot 104 to be summoned to a particular location. The user 102 may utter a voice command that is heard by a microphone on the robot 104, a microphone in a smart phone, or another device with a microphone such as a network enabled speaker or television. Alternatively, the user 102 may issue a command using an app on a smartphone, wearable device, tablet, or other computing device. Given that the location of the device at which the command was obtained is known, the robot 104 may be dispatched to that location. Alternatively, if the location is unknown, the robot 104 may search for the user 102.

The speech processing module 218 may be used to process utterances of the user 102. Microphones may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 144 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector) representing features/qualities of the raw audio data 230 within each frame. A frame may be a certain period of time, for example a sliding window of 25 ms of audio data taken every 10 ms, or the like. Many different features may be determined, as known in the art, and each feature represents some quality of the audio that may be useful for automated speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 234 to perform wakeword detection to determine when a user 102 intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 234 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 146 for speech processing. The audio data 236 corresponding to audio obtained by the microphone may be sent to a server 146 for routing to a recipient device or may be sent to the server 146 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

In some implementations, a particular wakeword or phrase may be associated with a stop condition. For example, the phrase "emergency stop" may be a wakeword that results in the application subsystem 108 producing a status signal 134 indicative of a stop condition. As a result, the use of this phrase may result in the robot 104 operating the rapid braking system.

The robot 104 may connect to the network 144 using one or more of the network interfaces 118. One or more servers 146 may provide various functions, such as ASR, natural language understanding (NLU), providing content such as audio or video to the robot 104, and so forth.

The other modules 220 may provide other functionality, such as object recognition, speech synthesis, user identification, and so forth. For example, an ASR module may accept as input raw audio data 230 or audio feature vectors 232 and may produce as output a text string that is further processed and used to provide input to a task module 128, and so forth. In one implementation, the text string may be sent via a network 144 to a server 146 for further processing. The robot 104 may receive a response from the server 146 and present output, perform an action, and so forth. For example, the raw audio data 230 may include the user 102 saying "robot, 104 go to the dining room". The audio data representative of this utterance may be sent to the server 146 that returns commands directing the robot 104 to the dining room of the home associated with the robot 104.

The utterance may result in a response from the server 146 that directs operation of other devices or services. For example, the user 102 may say "robot wake me at seven tomorrow morning". The audio data 236 may be sent to the server 146 that determines the intent and generates commands to instruct a device attached to the network 144 to play an alarm at 7:00 am the next day.

The other modules 220 may comprise a speech synthesis module that is able to convert text data to human speech. For example, the speech synthesis module may be used by the robot 104 to provide speech that a user 102 is able to understand.

The data store 210 may also store additional data such as user identifier data that is indicative of the user identifier of a user 102 associated with the robot 104. For example, one or more of the raw audio data 230 or the audio feature vectors 232 may be processed to determine the user identifier data of a user 102 based on the sound of the user's voice. In another implementation an image of the user 102 may be acquired using one or more cameras and processed using a facial recognition system to determine the user identifier data.

The data store 210 may store other data 226 such as user preference data.

Figure 3:
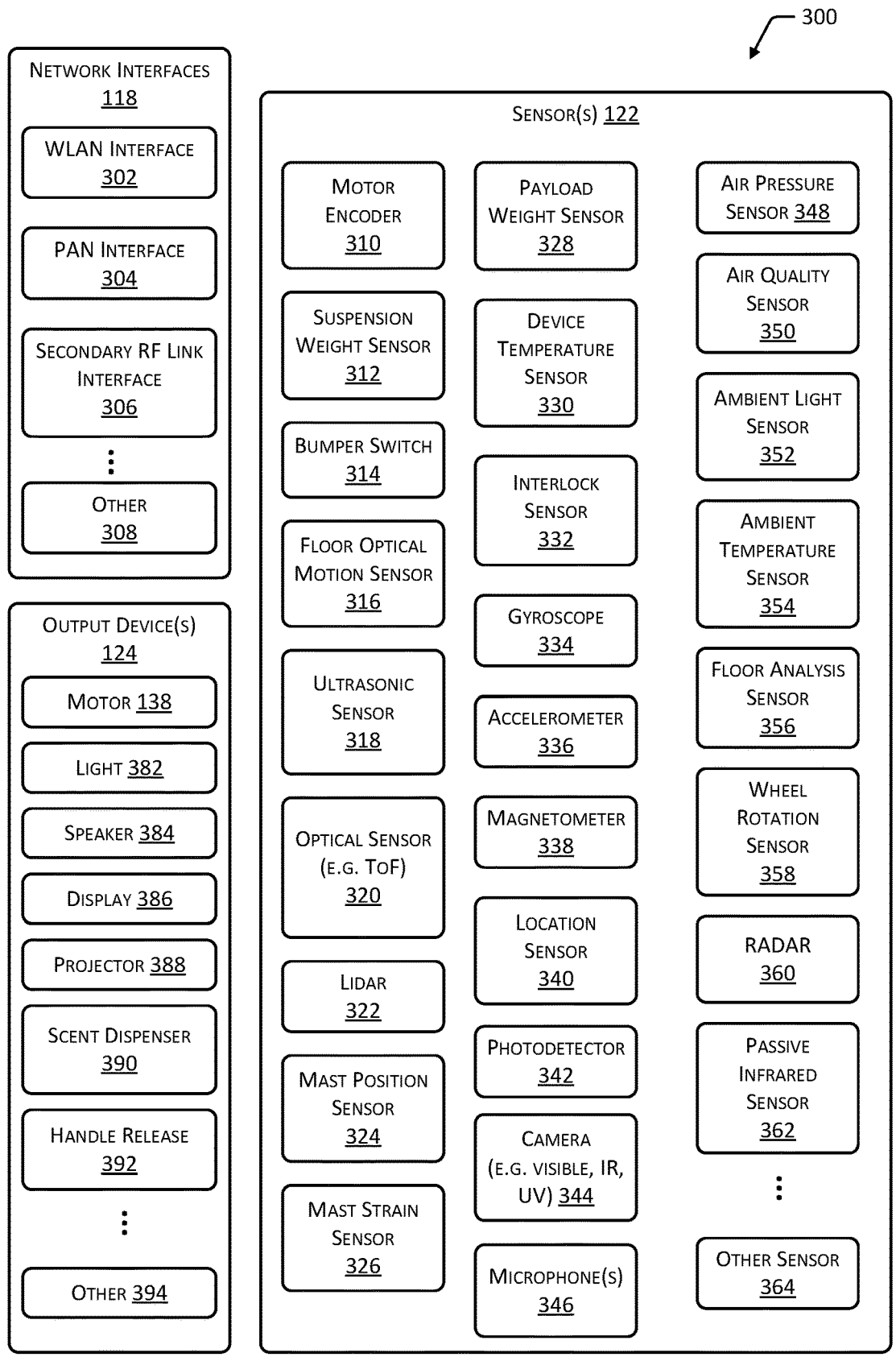
FIG. 3 is a block diagram of some components of the robot such as network interfaces, sensors, and output devices, according to some implementations.

FIG. 3 is a block diagram 300 of some components of the robot 104 such as network interfaces 118, sensors 122, and output devices 124, according to some implementations. The components illustrated here are provided by way of illustration and not necessarily as a limitation. For example, the robot 104 may utilize a subset of the particular network interfaces 118, output devices 124, or sensors 122 depicted here, or may utilize components not pictured.

The network interfaces 118 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilizes frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices in the event that communication fails using one or more of the WLAN interface 302 or the PAN interface 304. For example, in the event the robot 104 travels to an area within the physical environment that does not have Wi-Fi coverage, the robot 104 may use the secondary RF link interface 306 to communicate with another device such as a specialized access point, docking station 148, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 122. The sensors 122 depicted here are provided by way of illustration and not necessarily as a limitation. It is understood that other sensors 122 may be included or utilized by the robot 104, while some sensors 122 may be omitted in some configurations.

A motor encoder 310 provides information indicative of the rotation or linear extension of a motor 138. The motor 138 may comprise a rotary motor, or a linear actuator. In some implementations, the motor encoder 310 may comprise a separate assembly such as a photodiode and encoder wheel that is affixed to the motor 138. In other implementations, the motor encoder 310 may comprise circuitry configured to drive the motor 138. For example, the autonomous navigation module 130 may utilize the data from the motor encoder 310 to estimate a distance traveled.

A suspension weight sensor 312 provides information indicative of the weight of the robot 104 on the suspension system for one or more of the wheels 802 or the caster 804. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel 802. In other implementations, the suspension weight sensor 312 may provide an indication such as so many kilograms of force or newtons of force. The suspension weight sensor 312 may be affixed to one or more of the wheels 802 or the caster 804. In some situations, the safety module 214 may use data from the suspension weight sensor 312 to determine whether or not to inhibit operation of one or more of the motors 138. For example, if the suspension weight sensor 312 indicates no weight on the suspension, the implication is that the robot 104 is no longer resting on its wheels 802, and thus operation of the motors 138 may be inhibited. In another example, if the suspension weight sensor 312 indicates weight that exceeds a threshold value, the implication is that something heavy is resting on the robot 104 and thus operation of the motors 138 may be inhibited.

One or more bumper switches 314 provide an indication of physical contact between a bumper or other member that is in mechanical contact with the bumper switch 314. The safety module 214 may utilize sensor data 224 obtained by the bumper switches 314 to modify the operation of the robot 104. For example, if the bumper switch 314 associated with a front of the robot 104 is triggered, the safety module 214 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as a light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 may utilize sounds in excess of 20 kHz to determine a distance from the sensor to an object.

The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 224 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 122 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 214 and the autonomous navigation module 130 may utilize the sensor data 224 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 224 may be generated that is indicative of the presence of objects and the relative positions, shapes, and so forth are visible to the lidar 322. Data from the lidar 322 may be used by various modules. For example, the autonomous navigation module 130 may utilize point cloud data generated by the lidar 322 for localization of the robot 104 within the physical environment.

A mast position sensor 324 provides information indicative of a position of the mast. For example, the mast position sensor 324 may comprise limit switches associated with the mast extension mechanism that indicate whether the mast 914 is an extended or retracted position. In other implementations, the mast position sensor 324 may comprise an optical code on at least a portion of the mast 914 that is then interrogated by an optical emitter and a photodetector to determine the distance to which the mast 914 is extended. In another implementation, the mast position sensor 324 may comprise an encoder wheel that is attached to a mast motor that is used to raise or lower the mast 914. The mast position sensor 324 may provide data to the safety module 214. For example, if the robot 104 is preparing to deploy the carrying handle, data from the mast position sensor 324 may be checked to determine if the mast 914 is retracted, and if not, the mast 914 may be retracted prior to deployment of the carrying handle. By retracting the mast 914 before the carrying handle is deployed, injury to the user 102 as well as damage to the mast 914 is avoided as the user 102 bends down to grasp the carrying handle.

A mast strain sensor 326 provides information indicative of a strain on the mast with respect to the remainder of the robot 104. For example, the mast strain sensor 326 may comprise a strain gauge or load cell that measures a side-load applied to the mast 914, a weight on the mast 914, or downward pressure on the mast 914. The safety module 214 may utilize sensor data 224 obtained by the mast strain sensor 326. For example, if the strain applied to the mast 914 exceeds a threshold amount, the safety module 214 may direct an audible and visible alarm to be presented by the robot 104.

A payload weight sensor 328 provides information indicative of the weight associated with the modular payload bay 912. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 214 may utilize the payload weight sensor 328 to determine if the modular payload bay 912 has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more of the batteries 106, one or more motors 138, and so forth. In the event the temperature exceeds a threshold value, the component associated with that device temperature sensor 330 may be shut down.

One or more interlock sensors 332 may provide data to the safety module 214 or other circuitry that prevents the robot 104 from operating in an unsafe condition. For example, the interlock sensors 332 may comprise switches that indicate whether an access panel is open, if the carrying handle is deployed, and so forth. The interlock sensors 332 may be configured to inhibit operation of the robot 104 until the interlock switch indicates a safe condition is present.

A gyroscope 334 may provide information indicative of rotation of an object affixed thereto. For example, the gyroscope 334 may generate sensor data 224 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more locations sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provide sensor data 224 indicative of impinging light. For example, the photodetector 342 may provide data indicative of a color, intensity, duration, and so forth.

A camera 344 generates sensor data 224 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 224 comprising images being sent to the autonomous navigation module 130. In another example, the camera 344 may comprise a 10 megapixel or greater camera that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 130 may be acquired using a rolling shutter and subsequently may be processed to mitigate image artifacts.

One or more microphones 346 may be configured to acquire information indicative of sound present in the physical environment. In some implementations, arrays of microphones 346 may be used. These arrays may implement beamforming techniques to provide for directionality of gain. The robot 104 may use the one or more microphones 346 to acquire information from acoustic tags, accept voice input from users 102, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as a photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels 802 in contact with the floor may include an allegedly conductive pathway between the circuitry and the floor. By using two or more of these wheels 802, the circuitry may measure one or more of the electrical properties of the floor. Information obtained by the floor analysis sensor 356 may be used by one or more of the safety module 214, the autonomous navigation module 130, the task module 128, and so forth. For example, if the floor analysis sensor 356 determines that the floor is wet, the safety module 214 may decrease the speed of the robot 104 and generate a notification alerting the user 102.

The floor analysis sensor 356 may include other components as well. For example, a coefficient of friction sensor may comprise a probe that comes into contact with the surface and determines the coefficient of friction between the probe and the floor.

A wheel rotation sensor 358 provides output that is indicative of rotation of a wheel, such as a drive wheel or caster wheel. For example, the wheel may include a magnet, while the wheel rotation sensor 358 comprises a Hall sensor or reed switch that is able to detect the magnetic field of the magnet. As the wheel rotates, the sensor detects the magnet moving past. Based on when the magnet is detected, a determination may be made about one or more of a rotation rate of the wheel, whether the wheel is no longer rotating, and so forth. For example, if the wheel seizes and no longer rotates about its axle, there is the potential for the robot 104 to drag the wheel along the floor, potentially damaging the floor, the wheel, or both. If the wheel rotation sensor 358 detects that the wheel is not rotating about its axle while the motors 138 are engaged to move the robot 104, the status signal 134 may be produced that indicates a stop condition. As a result, the rapid braking system may operate to stop the robot 104.

In another implementation, the wheel rotation sensor 358 provides data indicative of one or more of a direction of orientation, angular velocity, linear speed of the wheel, and so forth. For example, if the wheel is a caster, the wheel rotation sensor 358 may comprise an optical encoder and corresponding target that is able to determine that the caster 804 transitioned from an angle of 0° at a first time to 49° at a second time.

The sensors 122 may include a radar 360. The radar 360 may be used to provide information as to a distance, lateral position, and so forth, to an object.

The sensors 122 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The robot 104 may include other sensors 364 as well. For example, a capacitive proximity sensor may be used to provide proximity data to adjacent objects. In another example, the other sensors 364 may include humidity sensors to determine the humidity of the ambient air. Other sensors 364 may include radio frequency identification (RFID) readers, near field communication (NFC) systems, coded aperture cameras, and so forth. For example, NFC tags may be placed at various points within the physical environment to provide landmarks for the autonomous navigation module 130. One or more touch sensors may be utilized to determine contact with a user 102 or other object.

The robot 104 may include one or more output devices 124. The motor 138 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on a surface such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

A handle release 392 may comprise an electrically operated mechanism such as one or more of a motor, solenoid, piezoelectric material, electroactive polymer, or shape-memory alloy. In one implementation, the handle release 392 may release a latch that allows a spring to push the carrying handle into the deployed position. In another implementation, the electrically operated mechanism may provide a force that deploys the carrying handle. Retraction of the carrying handle may be manual or electronically activated.

In other implementations, other 394 output devices may be utilized. For example, the robot 104 may include a haptic output device that provides output that produces particular touch sensations to the user 102. Continuing the example, a motor 138 with an eccentric weight may be used to create a buzz or vibration to allow the robot 104 to simulate the purr of a cat.

Figure 4:
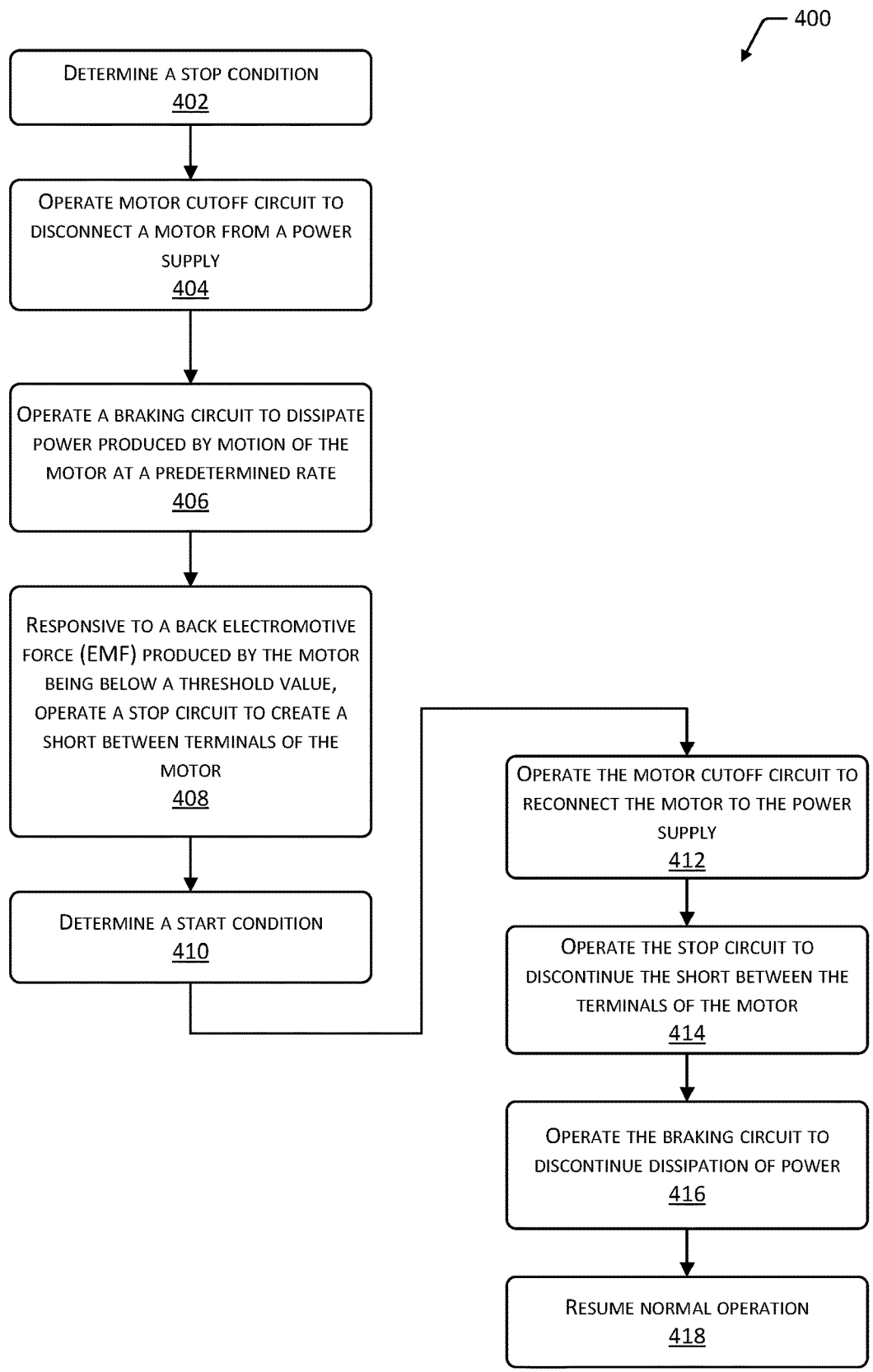
FIG. 4 is a flow diagram of a process to rapidly brake the robot, according to some implementations.

FIG. 4 is a flow diagram 400 of a process to rapidly brake the robot 104, according to some implementations. The process may be implemented at least in part by the circuitry described in FIGS. 5-7. The process is described with respect to a single motor 138 for ease of discussion, and not necessarily as a limitation. For example, the process may be used with two or more motors 138.

At 402 a stop condition is determined. For example, the stop condition may result from one or more of a failure of one or more components of the device, expected collision of the device with an object, collision of the device with an object, receipt of a command to stop movement of the motor 138, and so forth. As a result of the stop condition, a status signal 134 may be produced. For example, the stop condition may be indicated by the status signal 134 transitioning from a high value (having a voltage above a threshold value) to a low value (in which the voltage is below the threshold value). The status signals 134 from a plurality of components, subsystems, and so forth, may be used as input to a multiple-input AND gate. If any one of the status signals 134 is in the low state, the output from the AND gate is also low, producing a stop signal.

At 404, the motor cutoff circuit 132 is operated to disconnect the motor 138 from the power supply. For example, responsive to the stop signal, the motor cutoff circuit 132 may disconnect a first terminal of the motor 138 from a first terminal of the battery 106. The motor cutoff circuit 132 is described in more detail with regard to FIG. 5.

At 406 the braking circuit 140 is operated to dissipate power produced by motion of the motor 138. The power may be dissipated at a predetermined rate. For example, the braking circuitry 140 may use a current regulator to control the current delivered to a resistor, resulting in a dissipation of power at the predetermined rate.

At 408, responsive to back EMF produced by the motor 138 being below a threshold value, operate the stop circuit 142. The stop circuit 142 produces a short between the terminals (windings) of the motor 138. The stop circuit 142 is described in more detail with regard to FIG. 7.

At 410 a start condition is determined. For example, the start condition may be indicated by the status signal 134 transitioning the stop signal from the low value to the high value, indicative of the start condition.

At 412 the motor cutoff circuit 132 operates, responsive to the signal indicative of the start condition, reconnecting the motor 138 to the power supply.

At 414, the stop circuit 142 operates to discontinue the short between the terminals of the motor 138. For example, a coil in a relay in the stop circuit 142 may be energized once power is applied to the motor 138. Once energized, the connection between the terminals of the motor 138 is broken.

At 416 the braking circuit 140 operates to discontinue dissipation of power. For example, as the stop signal goes to the high state, the current regulator stops transferring power between the motor 138 and the resistor.

At 418, normal operation resumes. The motors 138 may operate as driven by the motor control circuit 136.

The operations at 412-416 may occur at substantially the same time. For example, the circuitry described in 412-416 may operate in parallel to one another.

Figure 5:
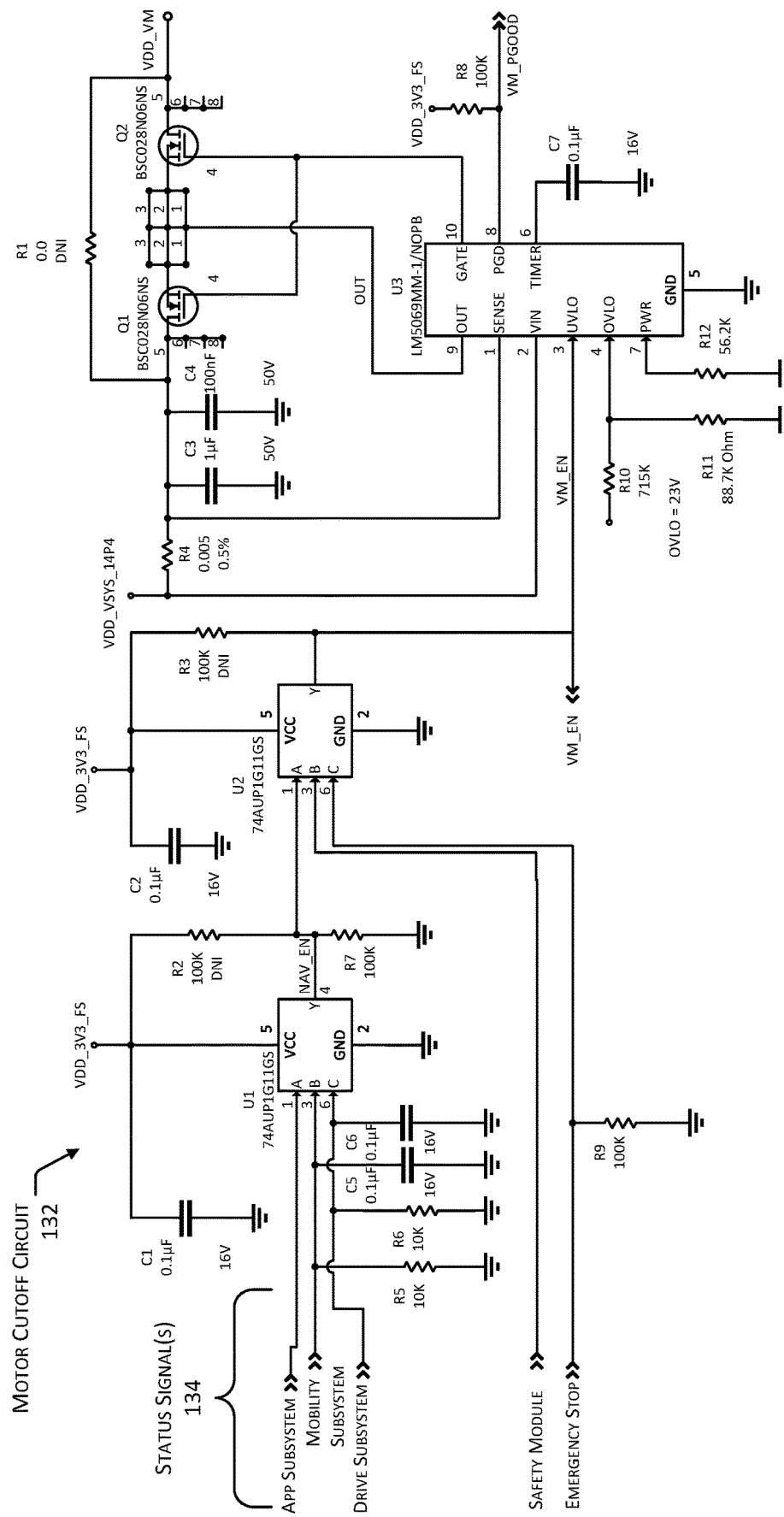
FIG. 5 is a schematic of a motor cutoff circuit of the rapid braking system, according to some implementations.

FIG. 5 is a schematic of a motor cutoff circuit 132 of the rapid braking system, according to some implementations. Specific component models, values, and so forth as indicated by this schematic, are described for illustration, and not necessarily as a limitation.

As described above, a source such as components or subsystems provides status signals 134 to an input of the motor cutoff circuit 132. These status signals 134 may represent a normal (non-fault) condition such as a "high" voltage (above a threshold voltage) while a stop (fault) condition is represented as a "low" voltage (below the threshold voltage). By utilizing the signaling, a power loss in the source will result in the presentation of a stop (fault) condition to the motor cutoff circuit 132.

Sources for the status signals 134 may include, but are not limited to, one or more parts of the motor control circuit 136, the application subsystem 108, the mast subsystem 110, the mobility subsystem 112, the drive subsystem 114, and so forth.

The status signals 134 are provided as inputs to a multiple-input AND gate, or combination of AND gates. In this illustration, a pair of the multiple-input AND gates U1 and U2 that can each handle three inputs are used in conjunction with one another to handle the five status signals 134. In other implementations, other configurations of AND gates may be used. The output of the multiple-input AND gate(s) is labeled in this schematic as "VM_EN". When all of the inputs to the multiple-input AND gate(s) are high, the output is high. As a result, in the event any one of the status signals 134 indicates a stop condition, the voltage on the VM_EN line will drop from the high to the low state.

In this illustration, the integrated circuit U3 comprises a Texas Instruments, Inc. LM5069MM-1 positive high-voltage host swap and in-rush current controller with power limiting. The VM_EN line connects to a UVLO pin of an integrated circuit U3. A VIN pin of U3 is connected to a positive terminal of the battery 106 that is labeled "VDD_VSYS_14P4" in this schematic.

The motor cutoff circuit 132 includes a first N-channel field effect transistor (Q1) and a second N-channel FET (Q2). The Q1 has a first source terminal, a first drain terminal connected to the positive terminal of the battery 106, and a first gate terminal connected to the GATE pin of U3. The Q2 has a second source terminal that is connected to the first source terminal of the Q1, a second drain terminal connected to the VDD_VM line, and a second gate terminal that is connected to the GATE pin of U3. The OUT pin of U3 is connected to the first source terminal and the second source terminal. As illustrated here, the resistor R12 on the PWR pin of U3 limits the power dissipation of Q1 and Q2 to approximately 45 W total during the power on inrush.

When the VM_EN line is high, indicative of normal operation, the U3 provides sufficient voltage at the GATE pin to place Q1 and Q2 into a conductive state, allowing current to pass from the positive terminal of the battery 106 to the VDD_VM line. The VDD_VM line, in turn, is connected to a positive terminal of the motor 138, or the motor control circuit 136 that in turn is connected to the positive terminal of the motor 138. In the event that the VM_EN line goes low, U3 discontinues the voltage at the GATE pin, placing both Q1 and Q2 into a non-conductive state, preventing current flow between the battery 106 and the motor 138.

The operation of the motor cutoff circuit 132 is failsafe. A single status signal 134 indicative of a stop condition results in the motor 138 being disconnected from the battery 106. Likewise, a power failure to the motor cutoff circuit 132 also results in the motor 138 being disconnected from the battery 106. As illustrated, the motor cutoff circuit 132 may omit the use of any reprogrammable devices, further simplifying operation.

Figure 6A:
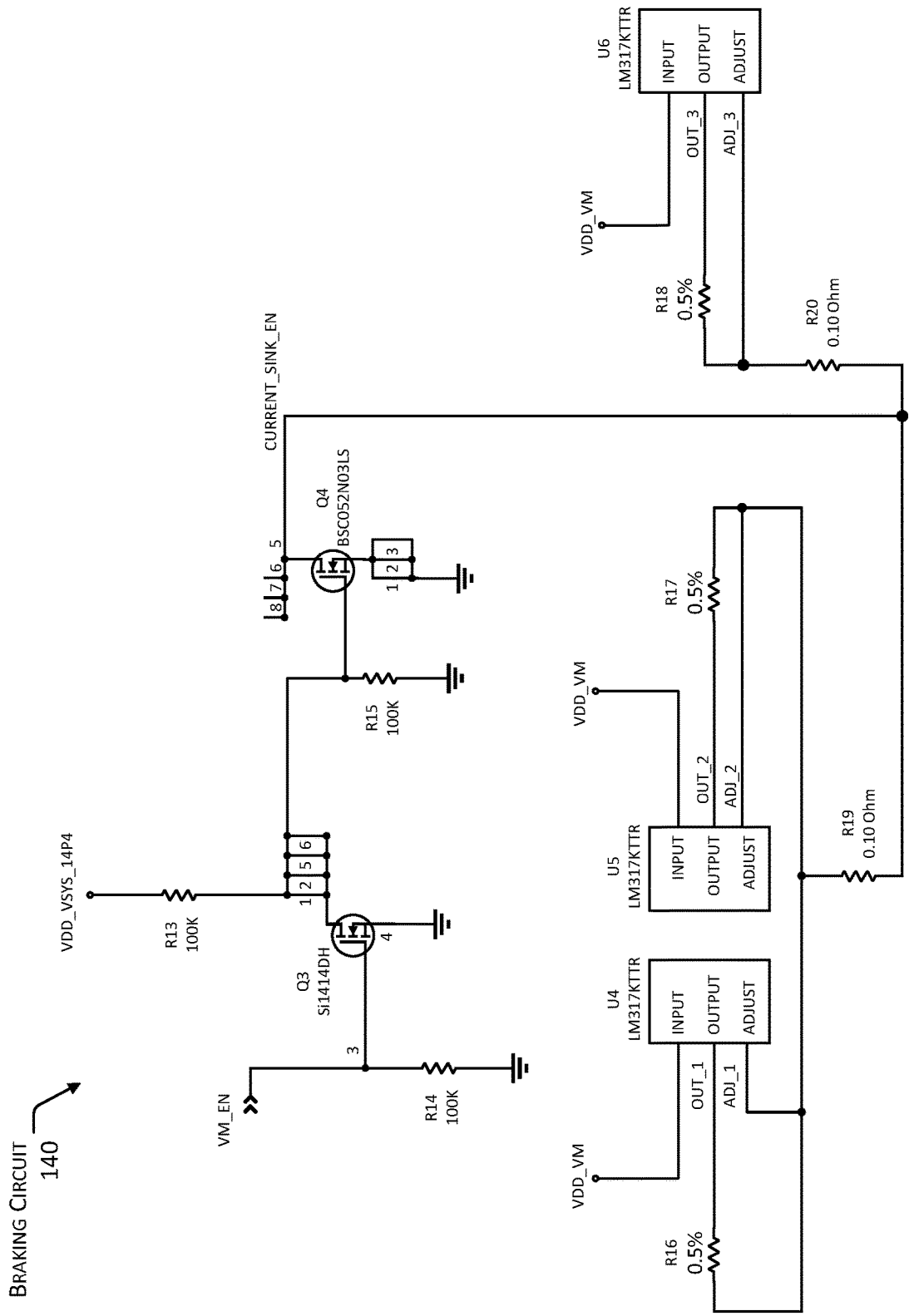
FIG. 6A is a schematic of a braking circuit of the rapid braking system, according to some implementations.

FIG. 6A is a schematic of a braking circuit 140 of the rapid braking system, according to some implementations. Specific component models, values, and so forth as indicated by this schematic, are described for illustration, and not necessarily as a limitation.

The braking circuit 140 accepts as input the signal provided by the VM_EN line. The VM_EN line is high during normal operation and low when a stop condition has been determined.

The VM_EN line is connected to resistor R14 that in turn connects to ground. An N-channel field effect transistor Q3 has a first source terminal connected to the ground, a first drain terminal, and a first gate terminal that is connected to the VM_EN line. The first drain terminal of Q3 is connected to resistor R13, which in turn is connected to the positive terminal of the battery 106. The first drain terminal of Q3 is also connected to resistor R15, which in turn is connected to the ground.

The first drain terminal of Q3 is connected to a second gate terminal of an N-channel FET Q4. A second source terminal of Q4 is connected to the ground. Q3 inverts the signal present at VM_EN to control Q4. For example, when the VM_EN is high, the output from the drain of Q4 is low, placing Q4 into a non-conducting state.

The braking circuit 140 includes one or more current regulators, such as U4, U5, and U6 as illustrated. In this illustration, the current regulators U4, U5, and U6 may comprise a Texas Instruments Inc. LM317KTTR 3-terminal adjustable regulator. The number of current regulators may be determined based on the amount of power that is to be dissipated during braking, and the rate of that dissipation.

A second drain terminal of Q4 is connected via the CURRENT_SINK_EN line to a resistor, such as R20, that in turn is connected to an output voltage adjustment terminal such as an ADJUST pin of U6 and, via another resistor R18, to an OUTPUT pin. An INPUT pin of U6 is connected to the motor 138, such as the VDD_VM line. With this particular integrated circuit, the inclusion of the resistor R18 between the ADJUST and OUTPUT pin result in U6 operating as a precision current regulator. When the VM_EN signal is low, the CURRENT_SINK_EN line is connected to ground, and power from the VDD_VM line is dissipated. For example, the current regulator U6 controls the current transfer from VDD_VM to 2A, thus controlling the rate of power dissipation. By controlling the rate of current transfer by the current regulator, the rate at which the robot 104 decelerates may be selected. The other current regulators U4 and U5 may be similarly configured.

To dissipate further power, additional current regulators and their associated circuitry may be used. For example, as depicted here, the three current regulators U4, U5, and U6 are used.

Figure 6B:
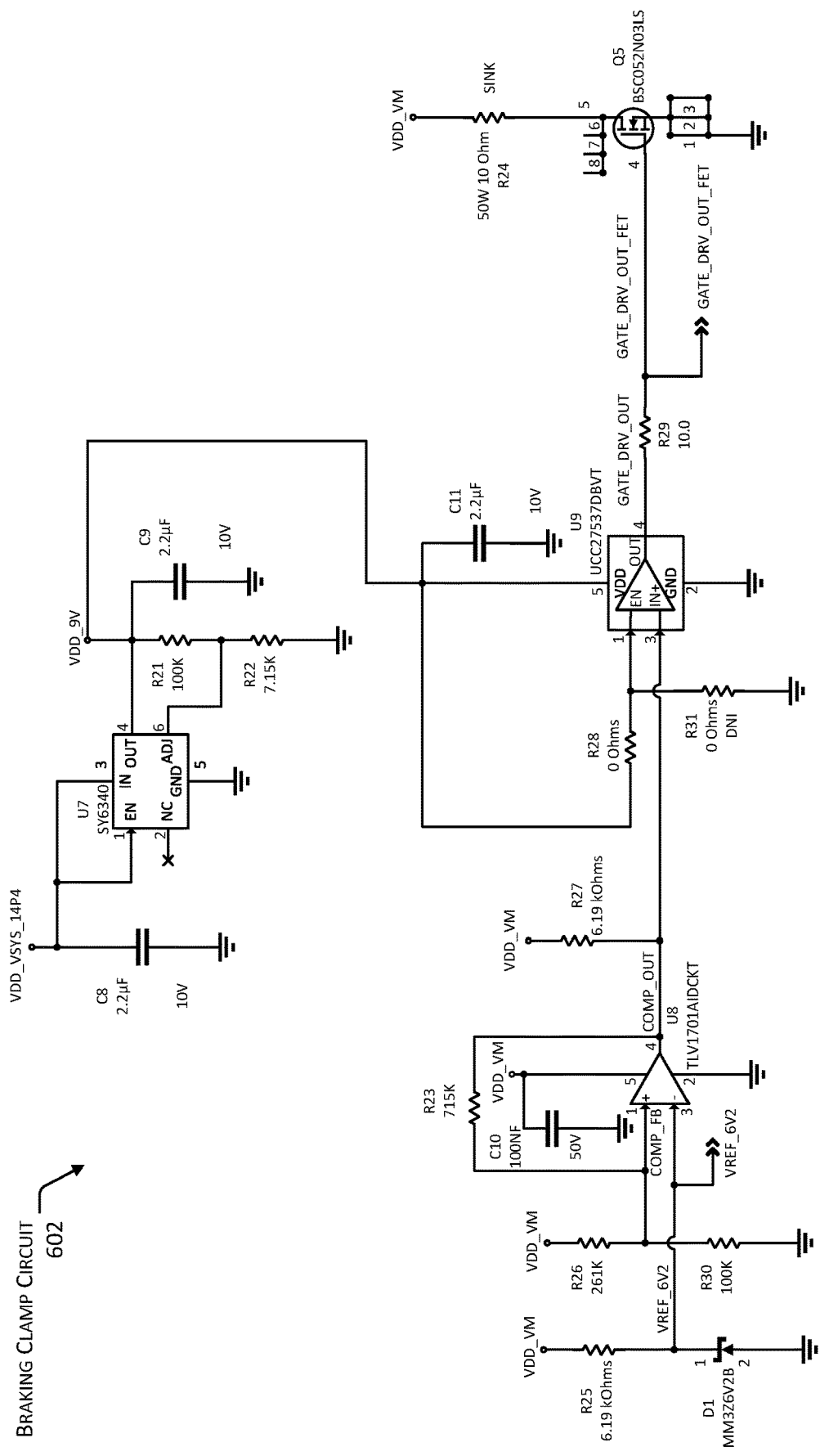
FIG. 6B is a schematic of a braking clamp circuit of the braking circuit, according to some implementations.

FIG. 6B is a schematic of a braking clamp circuit 602 of the braking circuit 140, according to some implementations. Specific component models, values, and so forth as indicated by this schematic, are described for illustration, and not necessarily as a limitation.

In some implementations, abrupt disconnect of the motor 138 from the battery 106 may result in a voltage that could cause damage to one or more of the components in the robot 104. The braking clamp circuit 602 may be configured to determine if a voltage produced by the motor 138 exceeds a threshold value, and if so, directly connects the motor 138 to a resistive load, clamping this spiking voltage. The braking clamp circuit 602 may operate in conjunction with the current regulators U4, U5, and U6 described above. When the voltage produced by the motor 138 drops below the threshold value, the braking clamp circuit 602 may disconnect the resistive load, with the remaining energy dissipated through the current regulators U4, U5, and U6 as described above.

In this illustration, a comparator U8 is used to determine if the voltage on the VDD_VM line is greater than a threshold value, such as 24V. If so, the comparator U8 produces a high value that is provided to an input pin of U9 a single-channel high-speed gate driver, such as the UCC27537DBVT from Texas Instruments, Inc. The output from U9 is connected to a gate terminal of FET Q5. When the output from U9 is high, Q5 is transitioned to a conducting state. The source terminal of Q5 is connected to the ground while the source terminal of Q5 is connected to the VDD_VM line via a sink resistor. This sink resistor exhibits relatively low resistance, such as 10 ohms, and a high power dissipation rating, such as 50 W. With this circuit, if the VDD_VM exceeds the threshold value, the sink resistor provides the VDD_VM with a path to ground, dissipating energy from the motor 138 in the sink resistor. When the voltage on the VDD_VM line is below the threshold, Q5 is transitioned to a non-conductive state, stopping current flow through the sink resistor. Meanwhile, the current regulators U4, U5, AND U6 as described above may be operating and continue operating to dissipate power produced by the motor 138.

Figure 7:
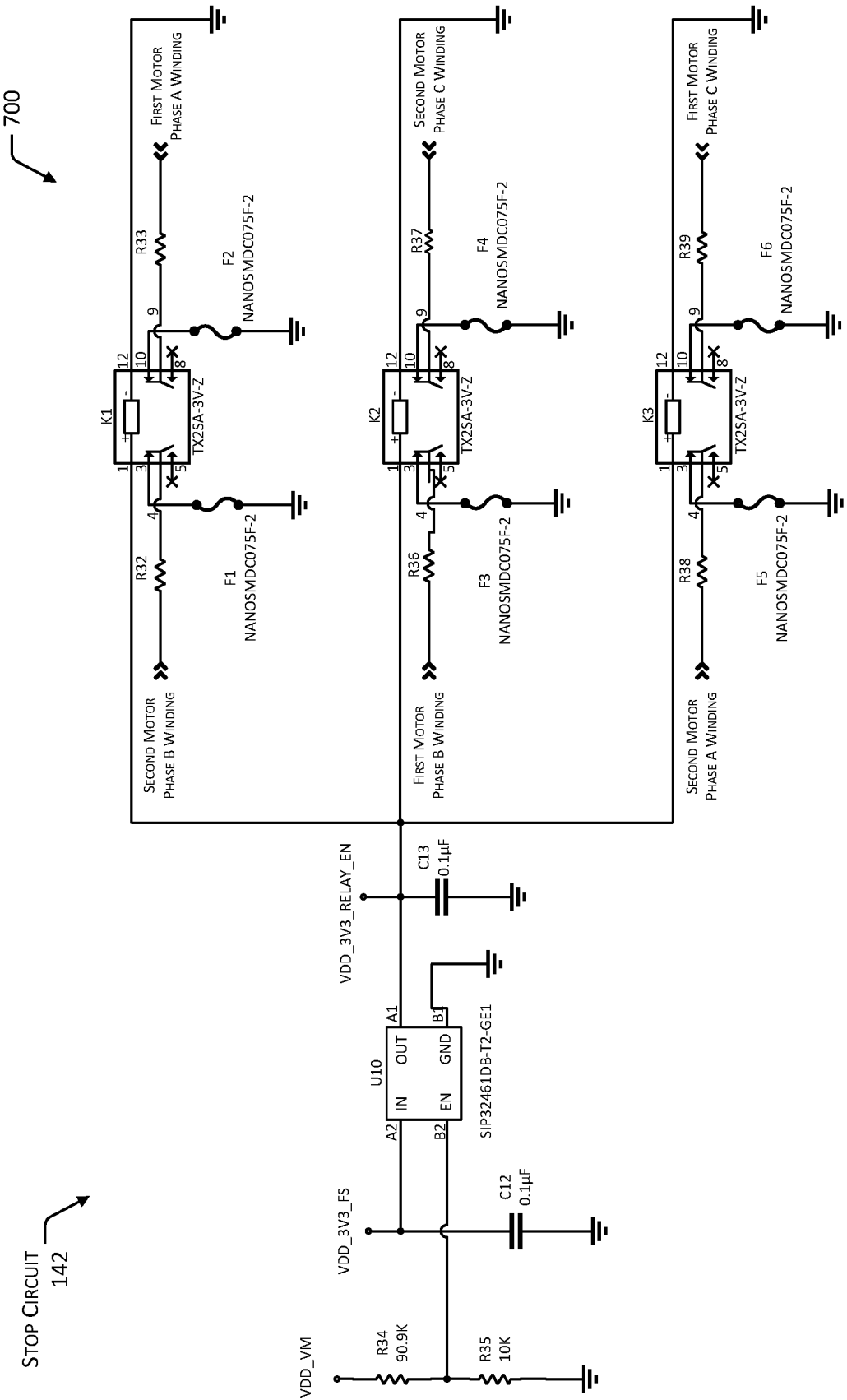
FIG. 7 is a schematic of a stop circuit of the rapid braking system, according to some implementations.

FIG. 7 is a schematic 700 of a stop circuit 142 of the rapid braking system, according to some implementations. Specific component models, values, and so forth as indicated by this schematic, are described for illustration, and not necessarily as a limitation.

The VDD_VM line that is connected to a terminal of the motor 138 provides input to the stop circuit 142. The VDD_VM line provides input to a voltage divider comprising R34 and R35. Output from the voltage divider is provided to an ENABLE terminal on a load switch U10. The ENABLE terminal is used to control operation of the load switch U10. For example, a logic high signal may be applied to the ENABLE terminal to activate the load switch U10. In one implementation, the load switch U10 may comprise a slew rate controlled load switch such as a SIP32461DB-T2-GE1 from Vishay Intertechnology, Inc.

An INPUT pin of U10 is connected to the power source, such as a low voltage line VDD_3V3_FS. A GROUND pin of U10 is connected to ground. An OUT pin of U10 is connected to a positive terminal of a coil in relay K1, while the negative terminal of the coil is connected to ground. K1 may comprise a TX2SA-3V-Z relay from Panasonic Electric Works Co., Ltd.

During normal operation, when VDD_VM is high, U10 provides a voltage to the OUTPUT pin that in turn energizes the coil of the relay K1. When the coil is energized, the circuit between a first contact and a second contact of the relay is open, and no current flows. The first contact of the relay K1 is connected the ground via a fuse or other overcurrent protection device. For example, the fuse may comprise a NANOSMDC075F-2 by Littelfuse, Inc. The second contact is connected to one or more terminals or windings of the motor 138. When the coil is deenergized, a connection is made between the first contact and the second contact, shorting the terminals of the motor 138.

The short across the windings of the motor 138 may retard further rotation of the shaft of the motor 138. For example, with a BLDC motor, a short between the terminals results in the motor's 138 shaft being resistant to rotation.

The presence of power at VDD_VM, such as during normal operation or while the motor 138 is producing power, results in the coil of the relay being energized, and no connection between the first contact and the second contact. The motor 138 may thus be driven by the motor control circuit 136 or may be slowed by the action of the braking circuit 140. When the voltage at VDD_VM drops below the threshold value, such as when the motor cutoff circuit 132 has disconnected the battery 106 from the motor 138, and when the motor 138 is producing a voltage that is less than the threshold value, the coil de-energizes and the motor 138 windings are shorted, producing the braking effect to resist further movement of the robot 104. When power is restored, such as when the status signals 134 indicate a normal condition and the motor cutoff circuit 132 restores power to the motor 138, the coil is again energized, the connection between the first and second coil contacts is broken, and the short is removed, allowing the motor 138 to operate.

The type and quantity of relays used may be based on the number and construction of motors 138 protected. In this illustration the robot 104 may have two motors 138 for motive power, a left motor and a right motor. Each motor may comprise a motor having one or more phases. For example, the motor may be a three-phase brushless DC motor. A winding from each phase may then be routed through a relay as shown. As a result, when the OUTPUT from U10 is low, the coils for all relays may be deenergized, resulting in all of the windings for all of the motors 138 being shorted.

This configuration of stop circuit 142 allows for failsafe operation. When the voltage on the VDD_VM line drops, the windings of the motor 138 are shorted, inhibiting further rotation of the motors 138. If an external force, such as the user 102, were to push the robot 104 and cause the motor 138 to turn, the fuses would open, breaking the short, preventing damage to the components of the robot 104.

Figure 8:
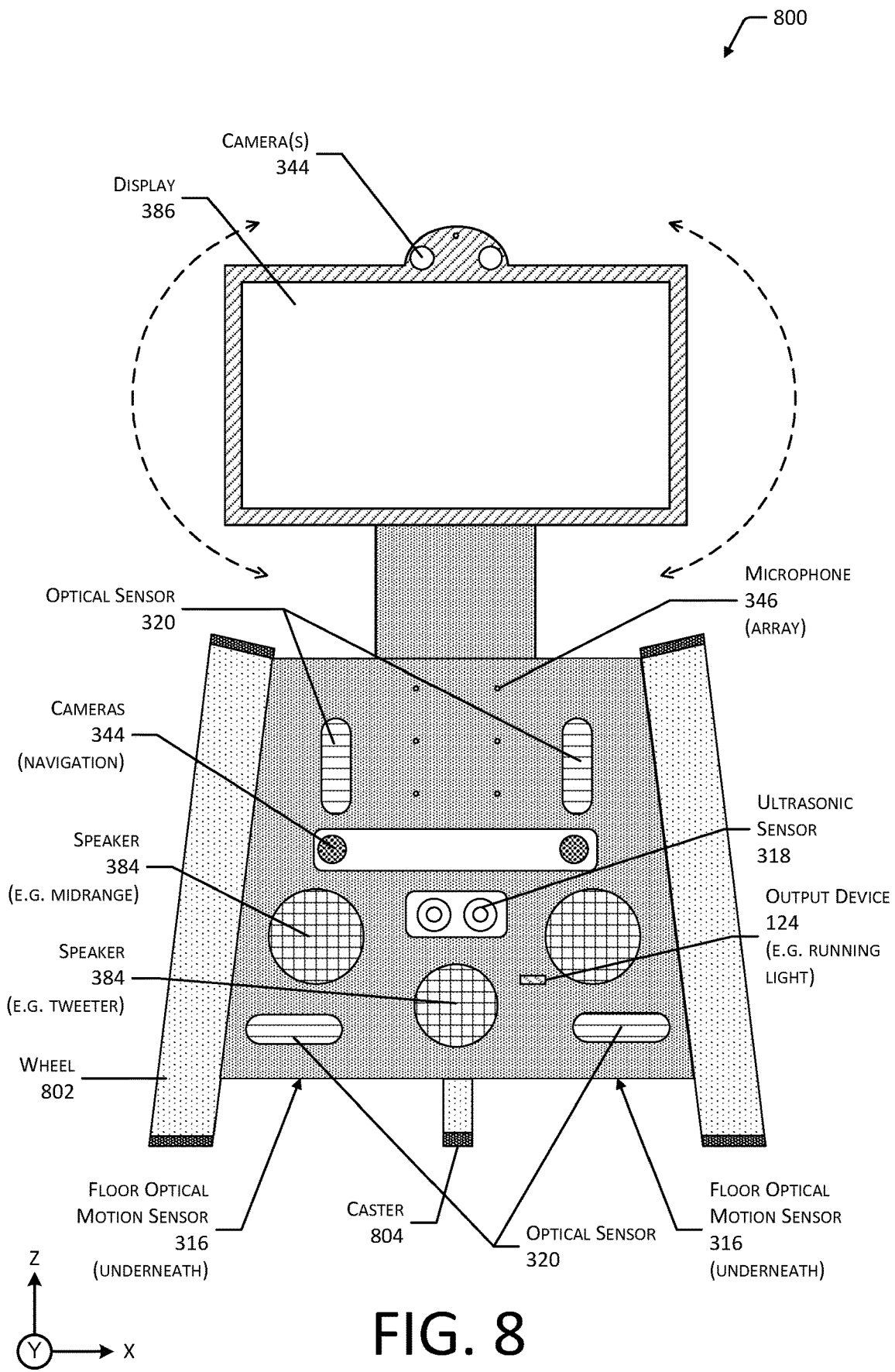
FIG. 8 is a front view of the robot, according to some implementations.

FIG. 8 is a front view 800 of the robot 104, according to some implementations. In this view, wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 122. A first pair of optical sensors 320 are located along the lower edge of the front while a second pair of optical sensors 320 are located along an upper portion of the front. Between the second set of the optical sensors 320 is a microphone 346 (array).

The wheels 802 are drive wheels, driven by one or more motors 138. For example, a left motor 138 may drive the left wheel 802 and a right motor 138 may drive the right wheel 802.

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 110°. A relatively wide FOV allows for easier detection of moving objects, such as users 102 or pets that may be in the path of the robot 104. Also, the relatively wide FOV facilitates the robot 104 being able to detect objects when turning.

The sensor data 224 comprising images produced by this pair of cameras 344 can be used by the autonomous navigation module 130 for navigation of the robot 104. The cameras 344 used for navigation may be of different resolution from, or sensitive to different wavelengths than, cameras 344 used for other purposes such as video communication. For example, the navigation cameras 344 may be sensitive to infrared light allowing the robot 104 to operate in darkness, while the camera 344 mounted above the display 386 may be sensitive to visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

In this illustration, the display 386 is depicted with cameras 344 arranged above the display 386. The cameras 344 may operate to provide stereoimages of the physical environment, the user 102, and so forth. For example, an image from each of the cameras 344 above the display 386 may be accessed and used to generate stereo image data about a face of a user 102. This stereoimage data may then be used for facial recognition, user identification, gesture recognition, gaze tracking, and so forth. In other implementations, a single camera 344 may be present above the display 386.

The display 386 may be mounted on a movable mount. The movable mount may allow the display 386 to move along one or more degrees of freedom. For example, the display 386 may tilt, rotate as depicted here, and so forth. The size the display 386 may vary. In one implementation, the display 386 may be approximately 8 inches as measured diagonally from one corner to another.

An ultrasonic sensor 318 is also mounted on the front of the robot 104 and may be used to provide sensor data 224 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user 102, and so forth.

One or more bumper switches 314 (not shown) may be present along the front of the robot 104. For example, a portion of the housing of the robot 104 that is at the leading edge may be mechanically coupled to one or more bumper switches 314.

Other output devices 124, such as one or more lights 382, may be on an exterior of the robot 104. For example, a running light may be arranged on a front of the robot 104. The running light may provide light for operation of one or more of the cameras 344, a visible indicator to the user 102 that the robot 104 is in operation, and so forth.

One or more of the FOMS 316 are located on an underside of the robot 104.

Figure 9:
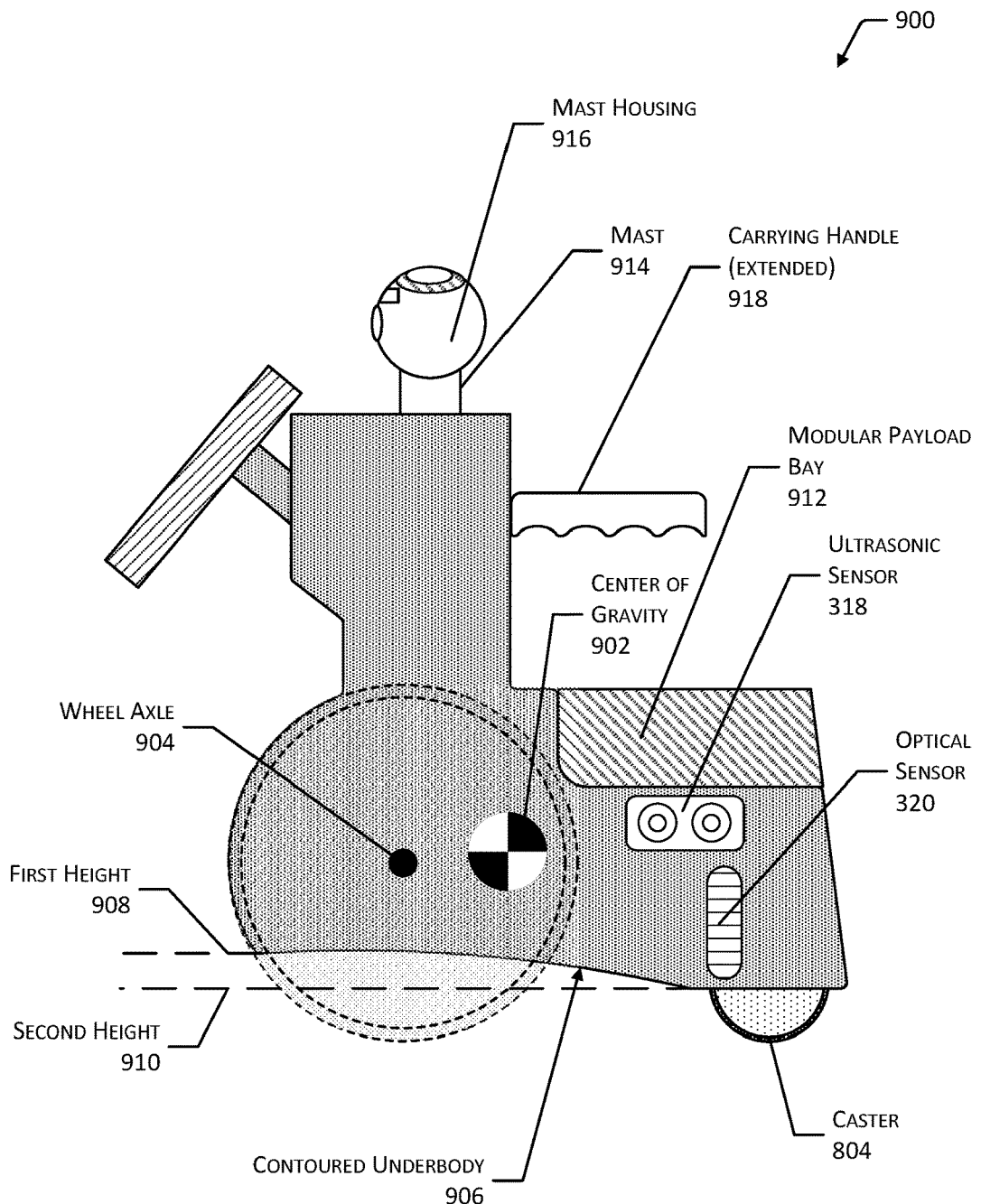
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user 102 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing of the robot 104 may comprise a shape-memory polymer that upon impact forms but then over time returns to the original shape.

In this side view, the left side of the robot 104 is depicted. An ultrasonic sensor 318 and an optical sensor 320 are present on either side of the robot 104.

The placement of the heavier components of the robot 104 may be arranged such that a center of gravity (COG) 902 is located between a wheel axle 904 of the front wheels 802 and the caster 804. Such placement of the COG 902 may result in improved stability of the robot 104 and may also facilitate lifting by the carrying handle. As described above, a wheel rotation sensor 358 may be used to determine if the caster 804 wheel or other wheel 802 is rotating about its axle.

In this illustration, the caster 804 is shown in a trailing configuration, in which the caster 804 is located behind or aft of the wheel axle 904 and the COG 902. In another implementation (not shown) the caster 804 may be in front of the axle of the wheels 802. For example, the caster 804 may be a leading caster 804 positioned forward of the COG 902.

The robot 104 may encounter a variety of different floor surfaces and transitions between different floor surfaces during the course of operation. The robot 104 may include a contoured underbody 906 that transitions from a first height 908 at the front of the robot 104 to a second height 910 that is proximate to the caster 804. This contour provides a ramp effect such that if the robot 104 encounters an obstacle that is below the first height 908, the contoured underbody 906 helps direct the robot 104 over the obstacle without lifting the driving wheels 802 clear from the floor. As a result, the robot 104 is better able to drive over small obstacles.

The robot 104 may include a modular payload bay 912 located within the lower structure. The modular payload bay 912 provides one or more of mechanical or electrical connectivity with the robot 104. For example, the modular payload bay 912 may include one or more engagement features such as slots, cams, ridges, magnets, bolts, and so forth that are used to mechanically secure an accessory within the modular payload bay 912. In one implementation, the modular payload bay 912 may comprise walls within which the accessory may sit. In another implementation, the modular payload bay 912 may include other mechanical engagement features such as slots into which the accessory may be slid and engage.

The modular payload bay 912 may include one or more electrical connections. For example, the electrical connections may comprise a universal serial bus (USB) connection that allows for the transfer of data, electrical power, and so forth between the robot 104 and the accessory. In some implementations the accessory may include one or more I/O devices 120.

The robot 104 may incorporate a display 386 that may be utilized to present visual information to the user 102. In some implementations, the display 386 may be located with or affixed to the upper structure. In some implementations, the display 386 may comprise a touch screen that allows user input to be acquired. The display 386 may be mounted on a movable mount that allows motion along one or more axes. For example, the movable mount may allow the display 386 to be tilted, rotated, and so forth. The display 386 may be moved to provide a desired viewing angle to the user 102, to provide output from the robot 104, and so forth. For example, the output may comprise the display 386 being tilted forward and backward to provide a gestural output equivalent to a human nodding their head.

The robot 104 may incorporate a mast 914. The mast 914 provides a location from which additional sensors 122 or output devices 124 may be placed at a higher vantage point. The mast 914 may be fixed or extensible. The extensible mast 914 is depicted in this illustration. The extensible mast 914 may be transitioned between a retracted state, an extended state or placed at some intermediate value between the two.

At the top of the mast 914 may be a mast housing 916. In this illustration, the mast housing 916 is approximately spherical, however in other implementations other physical form factors such as cylinders, squares, or other shapes may be utilized.

The mast housing 916 may contain one or more sensors 122. For example, the sensors 122 may include a camera 344 having a field-of-view (FOV). In another example, the sensors 122 may include an optical sensor 320 to determine a distance to an object. The optical sensor 320 may look upward, and may provide information as to whether there is sufficient clearance above the robot 104 to deploy the mast 914. In another example, the mast housing 916 may include one or more microphones 346.

One or more output devices 124 may also be contained by the mast housing 916. For example, the output devices 124 may include a camera flash used to provide illumination for the camera 344, and indicator light that provides information indicative of a particular operation of the robot 104, and so forth.

Other output devices 124, such as one or more lights 382, may be elsewhere on an exterior of the robot 104. For example, a light 382 may be arranged on a side of the upper structure.

In some implementations, one or more of the sensors 122, output devices 124, or the mast housing 916 may be movable. For example, the motor 138 may allow for the mast 914, the mast housing 916, or a combination thereof to be rotated allowing the FOV to be panned from left to right.

The mast 914 may be configured with one or more safety features. For example, a portion of the mast 914 at the base of the mast 914 may be configured to deform or break in the event that a load exceeding a threshold amount is applied to the mast 914. In another implementation, the mounting point for the mast 914 to the upper structure includes one or more breakaway elements, allowing the mast 914 to break away from the upper structure in the event that a load exceeds the threshold amount. In yet another implementation, the mast 914 may comprise a flexible structure that bends when a load exceeding a threshold amount is applied to the mast 914.

In some implementations, the display 386 may be mounted to the mast 914. For example, the display 386 may be incorporated into the mast housing 916. In another example, the display 386 may be mounted to a portion of the mast 914, and so forth.

The robot 104 may occasionally need to be manually transported from one location to another. For example, the robot 104 may be unable to climb stairs, enter a vehicle, and so forth. To facilitate manual transportation, the robot 104 may include a carrying handle 918. The carrying handle 918 may be retractable such that, when not in use, the carrying handle 918 is not accessible. The carrying handle 918 may retract and deploy via translation, rotation, or extension. For example, the carrying handle 918 may slide out from the upper structure, or may rotate about a pivot point at one end. In the event the robot 104 is to be transported, the carrying handle 918 may be deployed. The carrying handle 918 may be positioned such that at least a portion of the carrying handle 918 is over the COG 902 of the robot 104. In another implementation, the carrying handle 918 may deploy upwards from the lower structure.

Deployment of the carrying handle 918 may include manual operation, such as the user 102 pressing a handle release button, or may be electronically activated by the robot 104 using an electrically operated mechanism. For example, the electronic activation may involve the robot 104 generating a command that activates an electrically operated mechanism such as one or more of a motor, solenoid, piezoelectric material, electroactive polymer, shape-memory alloy, and so forth that releases a latch and allows a spring to push the carrying handle 918 into the deployed position. Continuing the example, the user 102 may utter a command such as "robot, deploy carrying handle". Automated speech recognition systems may be used to recognize the utterance and as a result the electrically operated mechanism is activated. In another implementation, the electrically operated mechanism may provide the force that deploys the carrying handle 918. Retraction of the carrying handle 918 may be manual or electronically activated.

By utilizing a retractable carrying handle 918 that may be stowed when not in use, safety of the robot 104 is improved. For example, the retracted carrying handle 918 is no longer exposed to be caught on some other object. Additionally, safety may be further improved by including a safety interlock associated with the carrying handle 918. The safety interlock may be based on data such as information indicative of the deployment of the carrying handle 918, or may be based at least in part on sensor data 224. For example, a switch may be used to indicate whether the carrying handle 918 has been stowed. While the carrying handle 918 is extended, operation of one or more motors 138 in the robot 104 may be inhibited or otherwise prevented from being operated. For example, while the carrying handle 918 is extended, the motors 138 used to drive the wheels 802 may be rendered inoperable such that the robot 104 may not move. In another example, while the carrying handle 918 is extended, the mast 914 may be placed into a retracted position and remain there until the carrying handle 918 has been stowed. By limiting the motion of the robot 104 while the carrying handle 918 is extended for use, the possibility for an adverse interaction between the robot 104 and the user 102 is reduced.

Figure 10:
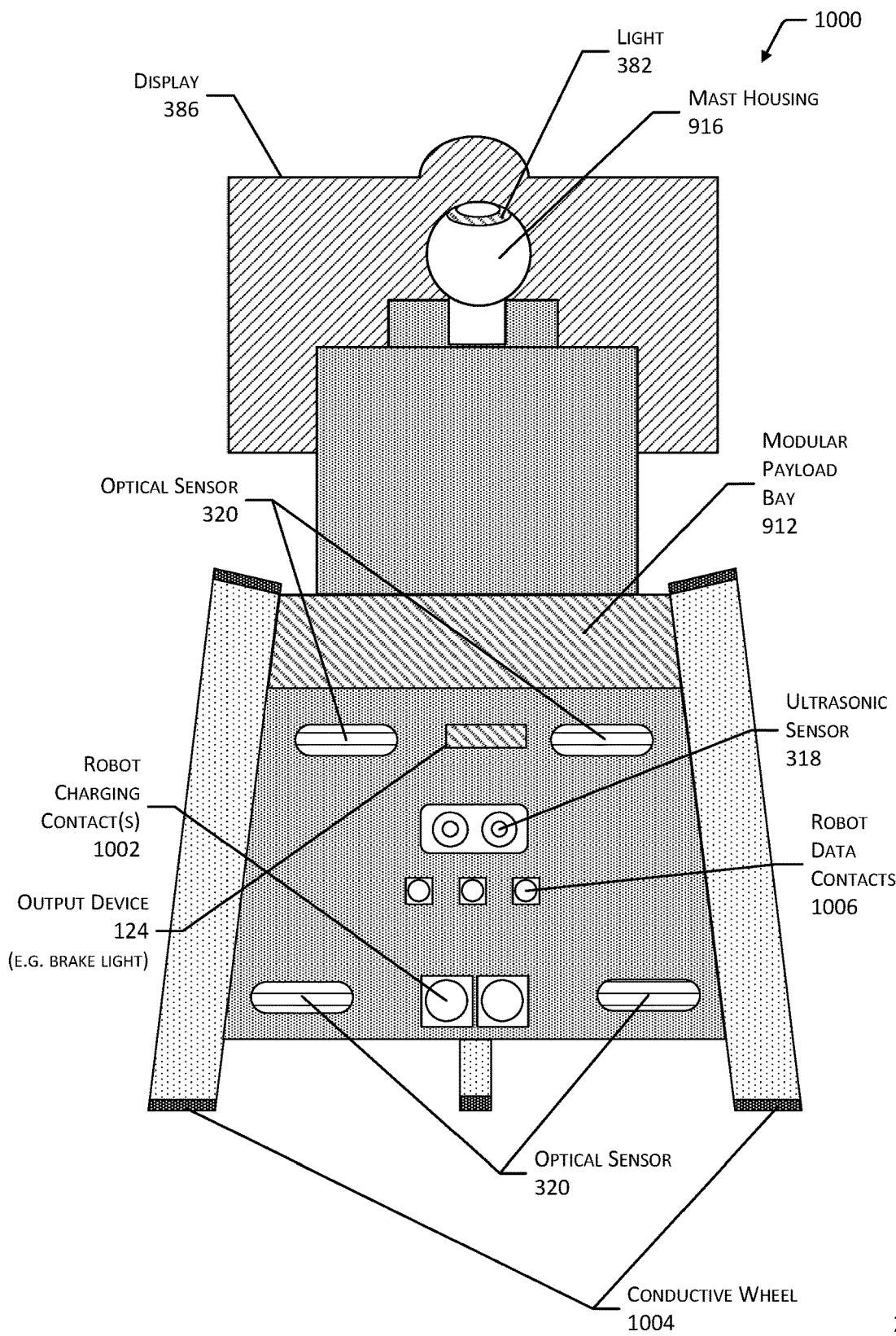
FIG. 10 is a back view of the robot, according to some implementations.

FIG. 10 is a back view 1000 of the robot 104, according to some implementations. In this view, as with the front, a first pair of optical sensors 320 are located along the lower edge of the rear of the robot 104, while a second pair of optical sensors 320 are located along an upper portion of the rear of the robot 104. An ultrasonic sensor 318 provides proximity detection for objects that are behind the robot 104.

Robot charging contacts 1002 may be provided on the rear of the robot 104. The robot charging contacts 1002 may comprise electrically conductive components that may be used to provide power from an external source such as a docking station 148 to the robot 104. In other implementations, wireless charging may be utilized. For example, wireless inductive or wireless capacitive charging techniques may be used to provide electrical power to the robot 104.

In some implementations the wheels 802 may be electrically conductive wheels 1004, that provide an electrical conductive pathway between the robot 104 and the floor.

One or more robot data contacts 1006 may be arranged along the back of the robot 104. The robot data contacts 1006 may be configured to establish contact with corresponding base data contacts within the docking station 148. The robot data contacts 1006 may provide optical, electrical, or other connections suitable for the transfer of data.

Other output devices 124, such as one or more lights 382, may be on an exterior of the back of the robot 104. For example, a brake light may be arranged on the back surface of the robot 104 to provide users 102 an indication that the robot 104 is stopping.

Figure 11:
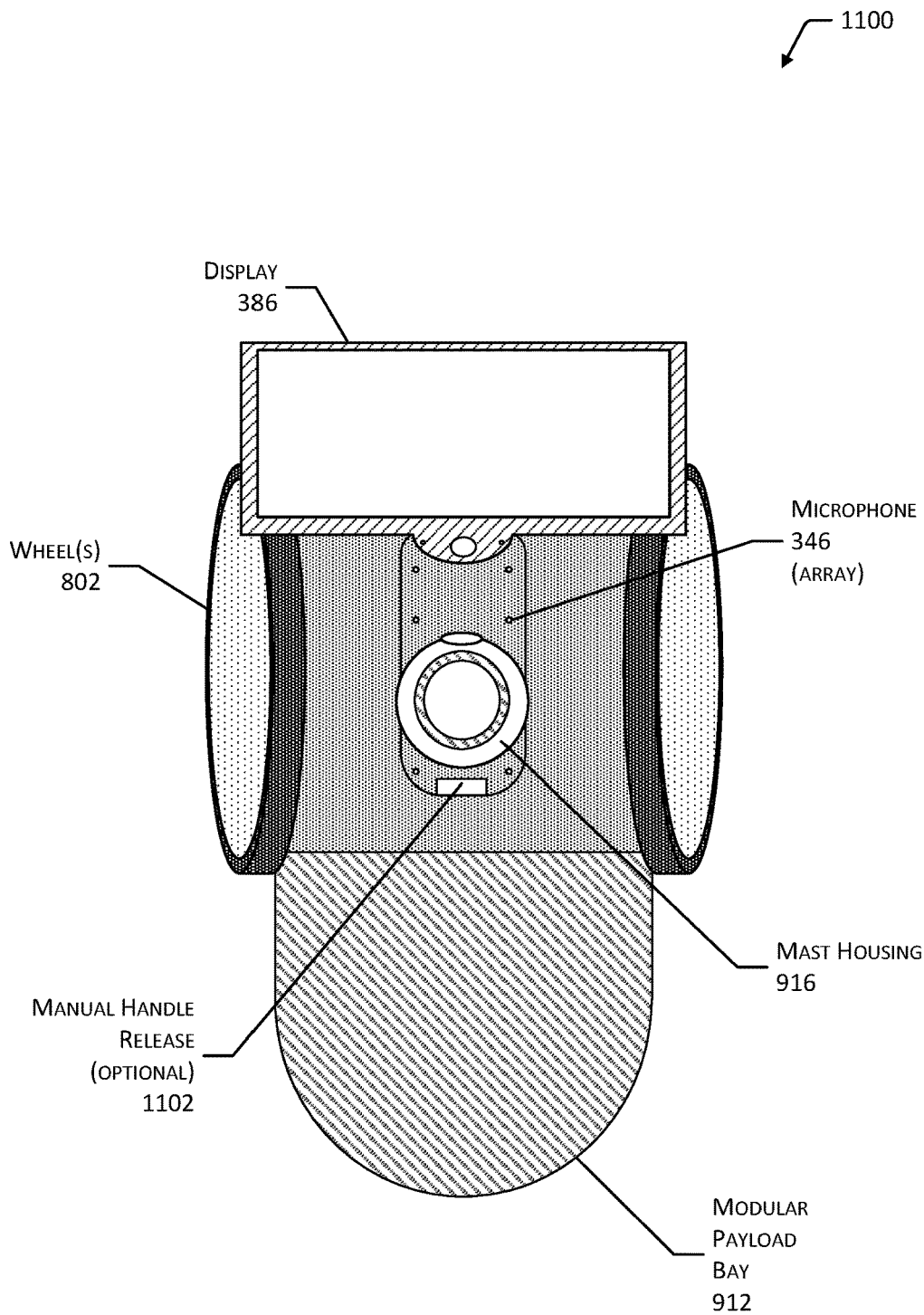
FIG. 11 is a top view of the robot, according to some implementations.

FIG. 11 is a top view 1100 of the robot 104, according to some implementations. In some implementations, a microphone 346 (array) may be emplaced along an upper surface of the upper structure. For example, the microphone 346 (array) is shown here comprising 8 microphones 346, two of which are concealed by the mast housing 916.

In some implementations, a manual handle release 1102 may be optionally provided. For example, the manual handle release 1102 when actuated may result in the carrying handle 918 being extended.

Figure 12:
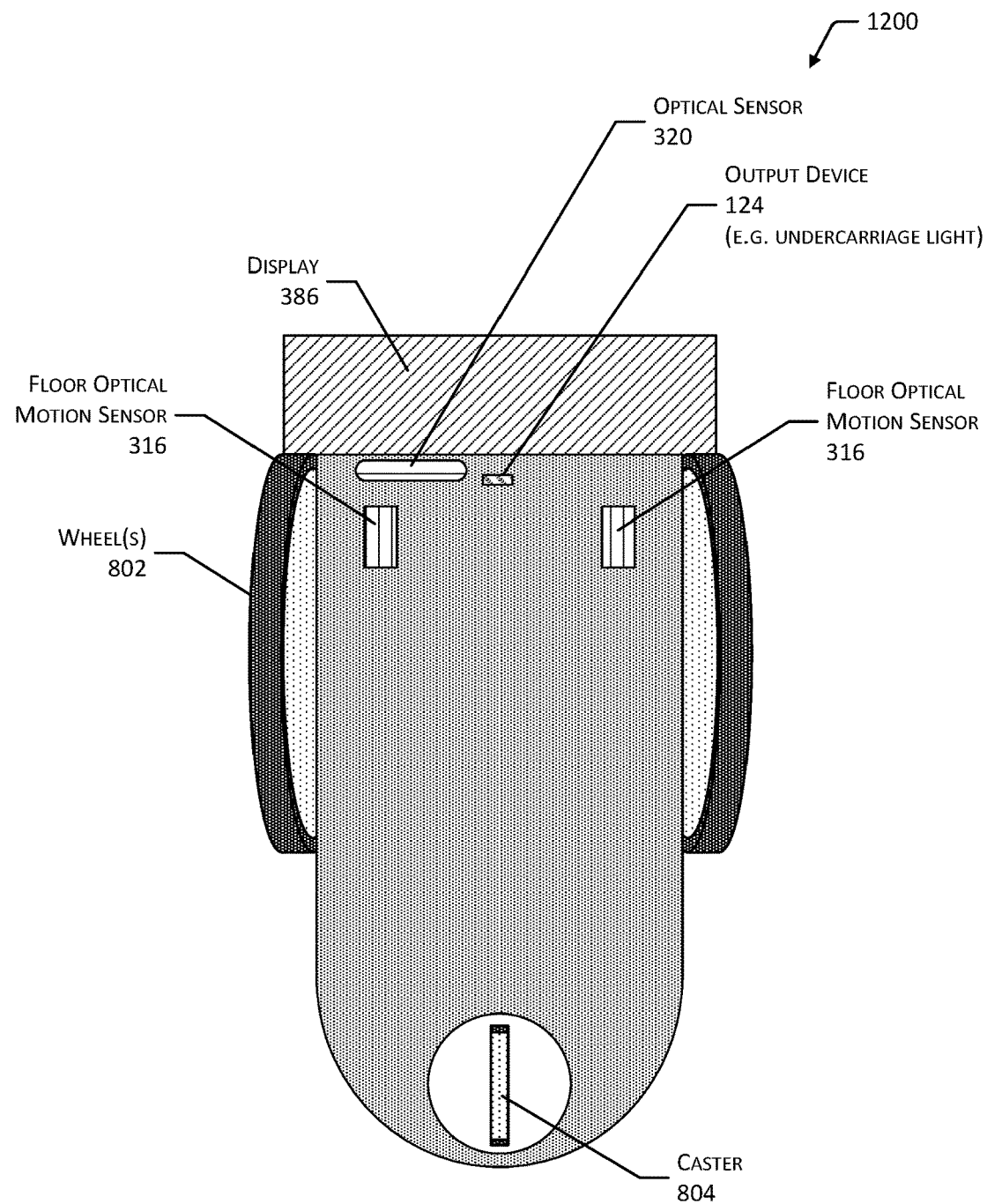
FIG. 12 is a bottom or underside view of the robot, according to some implementations.

FIG. 12 is a bottom 1200 or underside view of the robot 104, according to some implementations. In this illustration, a pair of FOMS 316 are visible and arranged on the underside of the robot 104 proximate to the front and on the left and right sides, proximate to the wheels 802. In another implementation, one or more FOMS 316 may be arranged along a centerline of the robot 104 running front and back.

One or more optical sensors 320 may be mounted on the underside proximate to one or more of the front edge or back edge of the robot 104. These optical sensors 320 may be used to detect the presence of a falling edge, such as a stair. For example, the optical sensors 320 mounted on the front or rear of the robot 104 may have a field-of-view (FOV) that results in a blind spot close to the robot 104. In the event that the user 102 picks up and moves the robot 104, the robot 104 could be placed into a situation where it is unable to move safely without toppling from a falling edge. As a result, optical sensors 320 may be mounted at or near the underside of the robot 104 to provide information about this region.

In other implementations, other sensors 122 may be mounted elsewhere to determine falling edges. For example, the optical sensors 320 on the front of the robot 104 may have a FOV that is directed downwards to allow for detection of the falling edge.

An output device 124, such as one or more undercarriage lights may be provided. For example, a light 382 may be arranged on an underside of the robot 104, proximate to or at a front edge.

Also depicted is the caster 804. In one implementation, the caster 804 may be freewheeling, that is free to swivel about. In another implementation, the caster 804 may be driven, such that a motor 138 or other actuator may change the direction of the caster 804 to facilitate steering of the robot 104.

Figure 13:
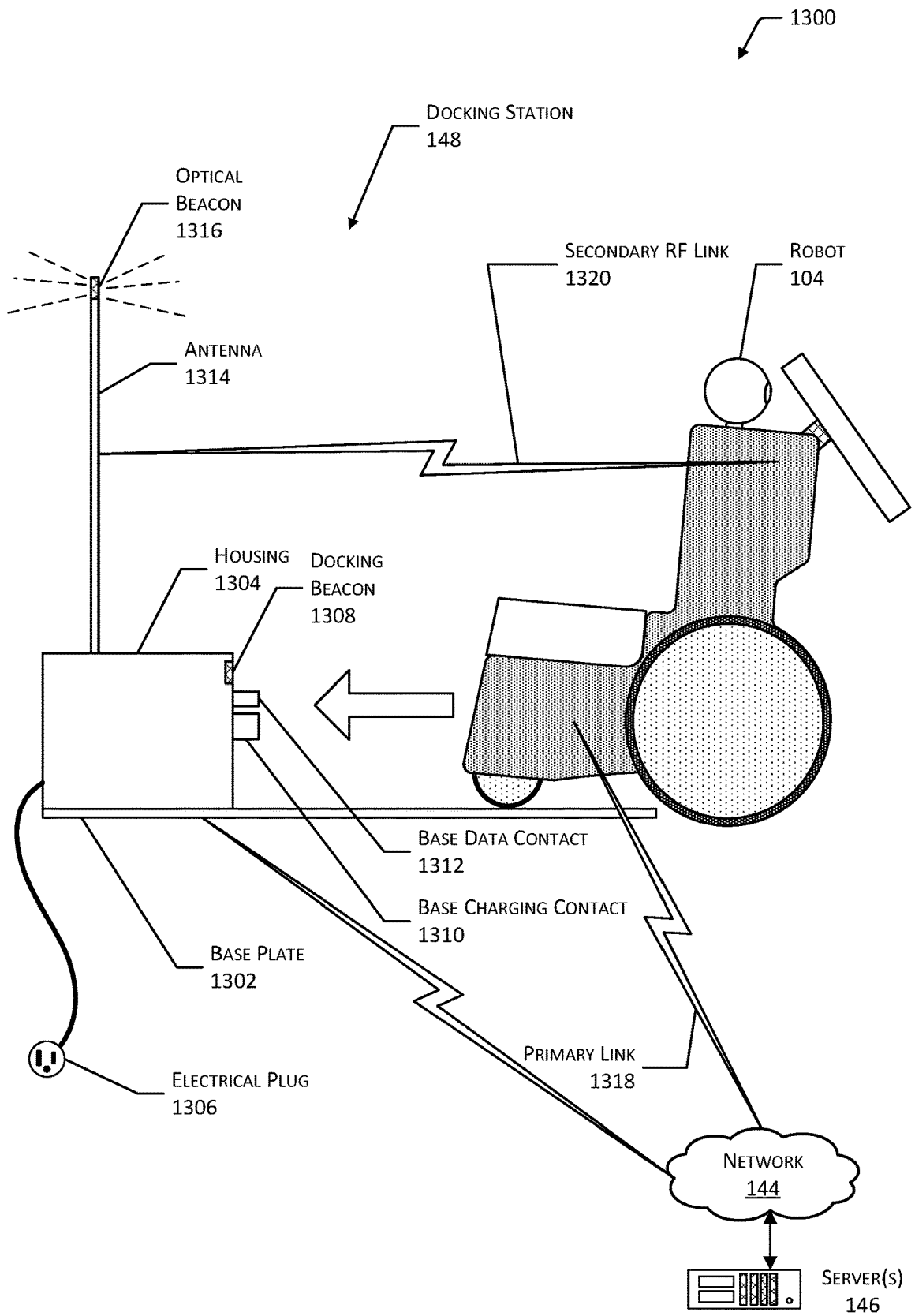
FIG. 13 depicts a diagram of a docking station with a secondary radio frequency link interface, according to some implementations.

FIG. 13 depicts a diagram 1300 of a docking station 148 with a secondary RF link interface 306, according to some implementations. The docking station 148 may comprise a base plate 1302. A housing 1304 may include electronics such as a power supply, one or more processors 116, one or more communication interfaces, and so forth. The docking station 148 may obtain power from an electrical plug 1306. For example, the electrical plug 1306 may be plugged into a household electrical outlet. In some implementations, the docking station 148 may include an uninterruptible power supply or alternative power source such as a fuel cell.

A docking beacon 1308 provides indicia suitable for guiding the robot 104 into the docking station 148 at a predetermined location. At that predetermined location, the robot 104 may engage one or more base charging contacts 1310 or base data contacts 1312. For example, the robot charging contacts 1002 may come in contact with the corresponding base charging contacts 1310 while the robot data contacts 1006, come into contact with the corresponding base data contacts 1312. In other implementations, one or more of the base charging contacts 1310 or the base data contacts 1312 may be along the base plate 1302, or otherwise configured to mate with corresponding robot charging contacts 1002 or robot data contacts 1006 located on an underside of the robot 104.

In other implementations, wireless power transfer may be used to charge the robot 104. For example, the base charging contacts 1310 may be omitted and a wireless inductive or wireless capacitive charging system may be used to provide electrical power to the robot 104.

The base charging contacts 1310 may be utilized to provide electrical power to charge the batteries 106 on board the robot 104, supply power to the robot 104 for operation while docked, and so forth. The robot 104 or the docking station 148 may include battery charger circuitry to control charging of the batteries 106 on board the robot 104. The battery charger circuitry may be configured to charge the batteries 106 at a first rate, second rate, and so forth. For example, the first rate may exhibit a lower amperage than the second rate, and may take longer to charge relative to the second rate. In some implementations, the first rate may be configured to minimize heating of cells within the batteries 106 on board the robot 104, reduce charging damage, and so forth.

The base data contacts 1312 may be used to provide data communication with the robot 104 while docked. For example, the base data contacts 1312 may be used to deliver updates to the instructions stored within the memory 126 of the robot 104.

The docking station 148 may include an antenna 1314 suitable for use with one or more of the network interfaces

118. For example, the antenna 1314 may be used for the secondary RF link interface 306.

One or more optical beacons 1316 may be provided on the docking station 148 to facilitate the robot 104 locating the docking station 148 within the physical environment. For example, the optical beacons 1316 may be placed atop the antenna 1314 to provide and improve line of sight with the robot 104. In some implementations, the robot 104 may utilize the camera 344 in the mast housing 916 to detect the optical beacon 1316. For example, the mast 914 may be extended to increase the height of the mast housing 916 and the camera 344 therein. The increased height of the camera 344 combined with the location of the optical beacons 1316 atop the antenna 1314 may provide an improved line of sight for the robot 104, facilitating locating of the docking station 148 by the robot 104.

The robot 104 may utilize a primary link 1318 to establish communication with other devices such as the network 144, one or more servers 146, the docking station 148, other robots 104, and so forth. For example, the primary link 1318 may comprise a WLAN interface 302.

In some implementations, the primary link 1318 may be unavailable. For example, a portion of the home may have inadequate Wi-Fi coverage. As described above, the docking station 148 may include a secondary RF link interface 306 that establishes a secondary RF link 1320 with the robot 104. In the event that a primary link 1318 is unavailable, the robot 104 may maintain communication with the docking station 148 using the secondary RF link 1320. The docking station 148 may utilize one or more network interfaces 118 on board the docking station 148 to establish communication with the network 144 or other devices. Continuing the example above, if the robot 104 finds itself in an area with inadequate Wi-Fi coverage, it may use the secondary RF link 1320 to access the docking station 148 and then access an external server 146 via the docking station 148.

In some implementations, the secondary RF link 1320 may also be used for navigational purposes. For example, secondary RF link 1320 may be used as a beacon to provide navigational input. In another example, the secondary RF link 1320 may be used to determine a distance from the docking station 148. Continuing this example, the robot 104 may send a request to the docking station 148 which then responds within a predetermined time. Based on the value of the predetermined time and the propagation delay associated with transmission, an estimated distance between the docking station 148 and robot 104 may be determined.

The docking station 148 may provide other functions as well. For example, the docking station 148 may include additional resources such as processors 116, memory 126, and so forth that allow the docking station 148 to provide various functions such as automated speech recognition, natural language understanding, and so forth. For example, if the robot 104 is unable to contact an external server 146 to process speech acquired using a microphone 346, the audio data 236 may be transmitted to the docking station 148 for local processing by the docking station 148. This may provide redundancy and still allow some functionality in the event that a wide area network connection, such as to the Internet, is unavailable. In some implementations, the docking station 148 may be configured to operate as an edge server to a network accessible resource, such as an external server 146.

The processes discussed in this disclosure may be implemented in hardware, software, or a combination thereof. In the context of software, the described operations represent computer-executable instructions stored on one or more computer-readable storage media that, when executed by one or more hardware processors 116, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

The circuitry presented here is provided by way of illustration and not necessarily as a limitation. The selection of particular components, the values of those components, and so forth may be varied to satisfy different operational conditions. For example, resistor values, selection of particular FETs, and so forth may vary to allow use with different size motors 138. In some implementations, particular circuits or portions thereof may be replaced with other circuitry of equivalent performance. For example, discrete components may be replaced with an integrated circuit, alternative circuit connections may be used, and so forth.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
one or more sensors;
a brushless direct current motor (motor) having a first terminal, a second terminal, and a third terminal, wherein a shaft of the motor is coupled to a wheel;
a battery;
a relay comprising:
a coil with a first coil terminal connected to an output terminal and a second coil terminal connected to the second terminal of the motor;
a first contact connected to a first fuse terminal of a first fuse, wherein a second fuse terminal of the first fuse is connected to the second terminal of the motor; and
a second contact connected to the first terminal of the motor;
one or more processors to execute instructions to:
receive sensor data from the one or more sensors;
determine, based on the sensor data, occurrence of a stop condition; and
generate a stop signal responsive to the stop condition; and
electronic circuitry to, responsive to the stop signal:
operate a first switching mechanism to disconnect the first terminal of the motor from the battery;
operate a braking circuit to dissipate, at a predetermined rate, power produced by motion of the motor; and
responsive to a back electromotive force (EMF) produced by the motor that is below a threshold value, operate a stop circuit that when the coil is deenergized connects the first contact and the second contact.

2. The robot of claim 1, wherein the stop condition is indicative of one or more of:
expected collision of the robot with an object,
collision of the robot with an object,
receipt of a command to stop movement of the robot, or
failure of one or more components of the robot.

3. The robot of claim 1, wherein the braking circuit comprises a current regulator that transfers power at a predetermined current to one or more resistors.

4. A device comprising:
a power source having a first terminal and a second terminal;
a motor comprising at least a first terminal and a second terminal, wherein the second terminal is connected to the second terminal of the power source;
a first circuit having an input that is connected to the first terminal of the power source and an output that is connected to the first terminal of the motor, wherein the first circuit operates responsive to a first signal at the input to disconnect the first terminal of the motor from the first terminal of the power source;
a second circuit that, responsive to the first signal, dissipates power produced by motion of the motor; and
a third circuit comprising:
a relay comprising:
a relay input connected to the output of the first circuit;
a first contact connected to a first fuse terminal of a first fuse, wherein a second fuse terminal of the first fuse is connected to the second terminal of the power source; and
a second contact connected to the first terminal of the motor; and
wherein when a back electromotive force (EMF) produced by the motor is below a first threshold value, the third circuit establishes a connection between the terminals of the motor.

5. The device of claim 4, wherein the first signal comprises a voltage that is below a threshold voltage that is representative of the device being in a fault condition of the device.

6. The device of claim 4, the first circuit comprising:
a multiple input AND gate that generates the first signal when at least one input is below a threshold voltage.

7. The device of claim 4, the first circuit comprising:
a first N-channel field effect transistor (first FET) having:
a first source terminal;
a first drain terminal connected to the first terminal of the power source; and
a first gate terminal connected to a terminal of an integrated circuit;
a second N-channel FET (second FET) having:
a second source terminal that is connected to the first source terminal of the first FET;
a second drain terminal that is connected to the first terminal of the motor; and
a second gate terminal that is connected to the terminal of the integrated circuit; and
the integrated circuit comprising circuitry that, responsive to the first signal being less than a second threshold value, decreases a voltage at the terminal of the integrated circuit below a threshold voltage, transitioning the first FET and the second FET to a non-conductive state.

8. The device of claim 4, the second circuit comprising:
a first resistor having a first resistor terminal connected to the second terminal of the power source and a second resistor terminal connected to the input of the first circuit;
a first N-channel field effect transistor (FET) having:
a first source terminal that is connected to the second terminal of the power source;
a first drain terminal; and
a first gate terminal;
a second resistor having a first resistor terminal connected to the first drain terminal and a second resistor terminal connected to the first terminal of the power source;
a third resistor having a first resistor terminal connected to the second terminal of the power source and a second resistor terminal connected to the first drain terminal;
a second N-channel FET having:
a second source terminal that is connected to the second terminal of the power source;
a second drain terminal; and
a second gate terminal that is connected to the second resistor terminal of the third resistor;
a current regulator comprising:
an input terminal connected to the first terminal of the power source,
an output terminal connected to a first resistor terminal of a fourth resistor, and
an output voltage adjustment terminal connected to a second resistor terminal of the fourth resistor; and
a fifth resistor having a first resistor terminal connected to the second resistor terminal of the fourth resistor and a second resistor terminal connected to the second drain terminal.

9. The device of claim 4, the third circuit further comprising:
- a load switch comprising:
  - a switch terminal connected to the power source;
  - an enable terminal that is used to control operation of the load switch;
  - a ground terminal connected to the second terminal of the power source; and
  - an output terminal;
- a first resistor having a first resistor terminal connected to the first terminal of the motor and a second resistor terminal connected to the enable terminal;
- a second resistor having a first resistor terminal connected to the enable terminal and a second resistor terminal connected to the second terminal of the power source;
- a first capacitor having a first capacitor terminal connected to the switch terminal and a second capacitor terminal connected to the second terminal of the power source;
- a second capacitor having a first capacitor terminal connected to the output terminal and a second capacitor terminal connected to the second terminal of the power source; and
- the relay further comprising:
  - a coil with a first coil terminal connected to the output terminal and a second coil terminal connected to the second terminal of the power source;
  - wherein a connection between the first contact and the second contact is broken when the coil is energized and made when the coil is deenergized.

10. The device of claim 4, wherein a connection between the first contact and the second contact is broken when a voltage present at the relay input is above a threshold voltage and made when the voltage present at the relay input is below the threshold voltage.

11. The device of claim 4, further comprising:
- a fourth circuit to, based on a first voltage between the first terminal of the motor and the second terminal of the motor exceeding a second threshold value, transition a first field-effect transistor to an on state that allows a first flow of current between the first terminal of the motor and the second terminal of the power source via a first resistor, wherein the second threshold value is greater than an operating voltage of the power source.

12. The device of claim 4, further comprising:
- a wheel;
- a sensor that provides sensor output indicative of a rotation rate of the wheel; and
- a fourth circuit to generate the first signal based on the motor operating and the sensor output indicating that the rotation rate of the wheel is less than a second threshold value.

13. The device of claim 4, further comprising:
- a drive wheel coupled to the motor;
- one or more sensors; and
- one or more processors to execute instructions to:
  - receive sensor data from the one or more sensors;
  - determine, based on the sensor data, occurrence of a stop condition comprising one or more of:
    - expected collision of the device with an object,
    - collision of the device with an object, or
    - receipt of a command to stop movement of the device; and
  - generate the first signal responsive to the stop condition.

* * * * *